(12) United States Patent
Liu et al.

(10) Patent No.: US 10,375,601 B2
(45) Date of Patent: Aug. 6, 2019

(54) CONDENSED MESSAGE MULTICAST METHOD AND A SYSTEM EMPLOYING SAME

(71) Applicant: APPROPOLIS INC., Calgary (CA)

(72) Inventors: Shaoteng Liu, Calgary (CA); Zhe He, Calgary (CA); Yuqi Li, Calgary (CA); Xiaobin Yang, Calgary (CA)

(73) Assignee: APPROPOLIS INC., Calgary, Alberta ( * ) Notice: Subject to any disclaimer, the term of this patent is extended or adjusted under 35 U.S.C. 154(b) by 4 days.

(21) Appl. No.: 15/872,745

(22) Filed: Jan. 16, 2018

(65) Prior Publication Data

US 2019/0037439 A1 Jan. 31, 2019

Related U.S. Application Data

(60) Provisional application No. 62/536,859, filed on Jul. 25, 2017.

(51) Int. Cl.
*H04W 28/06* (2009.01)
*G06F 9/30* (2018.01)
*H04L 29/12* (2006.01)
*H04W 16/14* (2009.01)

(52) U.S. Cl.
CPC ........ *H04W 28/06* (2013.01); *G06F 9/30029* (2013.01); *H04L 61/2069* (2013.01); *H04L 2212/00* (2013.01); *H04W 16/14* (2013.01)

(58) Field of Classification Search
CPC ... H04W 28/06; H04W 16/14; G06F 9/30029; H04L 2212/00; H04L 61/2069
USPC .......................................................... 370/329
See application file for complete search history.

(56) References Cited

U.S. PATENT DOCUMENTS

| | | | |
|---|---|---|---|
| 9,774,893 B2* | 9/2017 | Moon | H04N 21/23614 |
| 2008/0259891 A1 | 10/2008 | Dent | |
| 2009/0295430 A1 | 12/2009 | Stoica et al. | |
| 2010/0227611 A1* | 9/2010 | Schmidt | H04W 4/06 455/434 |
| 2012/0029817 A1 | 2/2012 | Khorashadi et al. | |
| 2013/0035110 A1 | 2/2013 | Sridhara et al. | |
| 2013/0191434 A1* | 7/2013 | Smith | G06F 9/542 709/201 |
| 2013/0223397 A1* | 8/2013 | Kim | H04L 5/0023 370/329 |

(Continued)

OTHER PUBLICATIONS

ISA/CA—PCT International Search Report and Written Opinion dated Apr. 16, 2018 for PCT/CA2018/050047.

(Continued)

*Primary Examiner* — Phong La
(74) *Attorney, Agent, or Firm* — Daniel R. Polonenko

(57) ABSTRACT

A computerized method of generating and transmitting a message to a plurality of recipient devices has the steps of obtaining a plurality of recipient multicast identifications (IDs) for the plurality of recipient devices, losslessly encoding the recipient multicast IDs into one or more codewords such that the total length of the one or more codewords is shorter than that of the recipient multicast IDs, generating the message by encapsulating at least the one or more codewords into a payload of the message, and transmitting the generated message to a network. When receiving such as message, a listener device decodes the one or more codewords to determine if it is a recipient.

21 Claims, 24 Drawing Sheets

(56) References Cited

U.S. PATENT DOCUMENTS

| | | | |
|---|---|---|---|
| 2013/0322276 A1* | 12/2013 | Pelletier | H04W 72/085 370/252 |
| 2014/0195149 A1 | 7/2014 | Yang et al. | |
| 2014/0328313 A1 | 11/2014 | Merlin et al. | |
| 2015/0098349 A1* | 4/2015 | Wei | H04W 16/14 370/252 |
| 2015/0230175 A1 | 8/2015 | Grant et al. | |
| 2016/0025498 A1 | 1/2016 | Le Grand | |
| 2016/0218833 A1 | 7/2016 | Sapio et al. | |
| 2017/0155648 A1* | 6/2017 | Bahr | H04L 12/282 |
| 2018/0263045 A1* | 9/2018 | Zhou | H04B 7/026 |

OTHER PUBLICATIONS

ISA/CA—Canadian Intellectual Property Office—International Search Report and Written Opinion, dated Apr. 16, 2018—PCT/CA2018/050047.

ISA/CA—Canadian Intellectual Property Office—International Search Report and Written Opinion, dated Jun. 28, 2018—PCT/CA2018/050415.

* cited by examiner

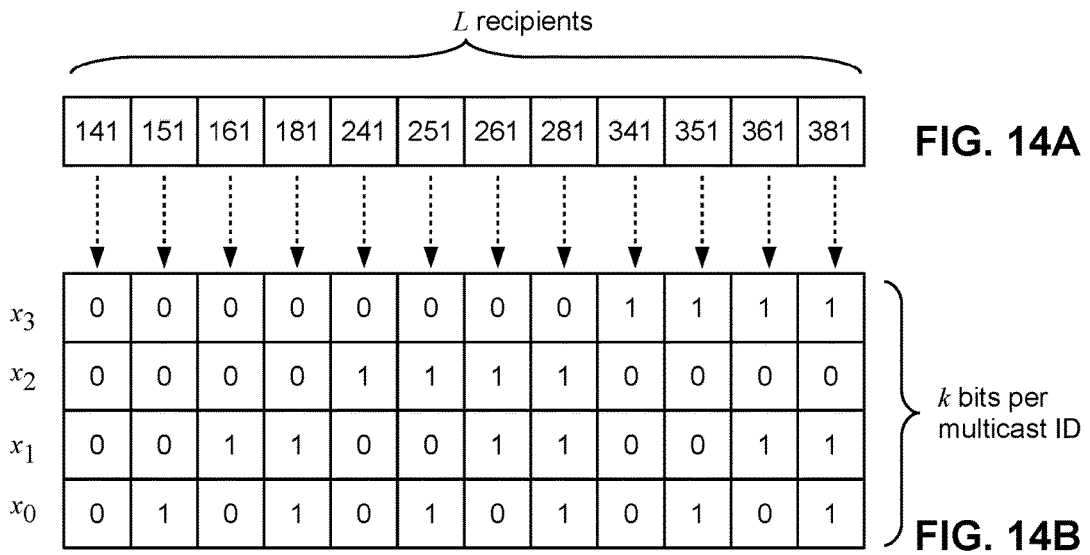

$$f(x_3, x_2, x_1, x_0) = \overline{x_3}\,\overline{x_2}\,\overline{x_1}\,\overline{x_0} + \overline{x_3}\,\overline{x_2}\,\overline{x_1}\,x_0 + \overline{x_3}\,\overline{x_2}\,x_1\,\overline{x_0} + \overline{x_3}\,\overline{x_2}\,x_1\,x_0$$
$$+ \overline{x_3}\,x_2\,\overline{x_1}\,\overline{x_0} + \overline{x_3}\,x_2\,\overline{x_1}\,x_0 + \overline{x_3}\,x_2\,x_1\,\overline{x_0} + \overline{x_3}\,x_2\,x_1\,x_0$$
$$+ x_3\,\overline{x_2}\,\overline{x_1}\,\overline{x_0} + x_3\,\overline{x_2}\,\overline{x_1}\,x_0 + x_3\,\overline{x_2}\,x_1\,\overline{x_0} + x_3\,\overline{x_2}\,x_1\,x_0$$

FIG. 14C

$$h(x_3, x_2, x_1, x_0) = \overline{x_3} + x_3\,\overline{x_2}$$

CONDENSED MESSAGE MULTICAST METHOD AND A SYSTEM EMPLOYING SAME

CROSS-REFERENCE TO RELATED APPLICATIONS

This application claims the benefit of U.S. Provisional Patent Application Ser. No. 62/536,859 filed Jul. 25, 2017, the content of which is incorporated herein by reference in its entirety.

FIELD OF THE DISCLOSURE

The present disclosure relates generally to wireless communication between a central node and one or more end-node devices, and in particular to wireless communication between a central node and one or more end-node devices using messages with data and encoded identification of recipients encapsulated therein.

BACKGROUND

Most wireless data network systems must adapt to limited communication resources between a central node (such as an access point, a gateway, or a base station) and the associated end-node devices (also denoted as end nodes or end-node-instances). Wireless data network systems frequently employ star topologies between end nodes and a central node. In such systems, due to the one-to-many communication nature between the central node and the end nodes, the limited communication resources of the central node must be scheduled carefully and utilized efficiently.

Due to the broadcast nature of the wireless medium, a central node can efficiently multicast common data to a certain number of end-node devices by utilizing the broadcast medium, in order to save communication resources in terms of bandwidth, time, and energy.

However, to ensure the correct delivery of data, a multicast message usually needs to specify the list of recipients. Herein, the term "recipients" refers to the subset of the end-node devices which the data is to be delivered thereto. As a result of the broadcast nature of the wireless medium, even an end-node device not included in the subset can also receive the multicast message. Therefore, each message receiver must check whether or not it is among the recipient list. The data is delivered only if the receiver is among the recipients.

Directly including the IDs of all the recipients into the multicast message may lead to an overly long message. US Patent Application Publication No. 2016/0218833 teaches a method to hash the recipients' IDs in order to compress them in a lossy way. However, the hashing-ID method may create false-positive match errors. For example, an end-node device not included in the recipient subset may find its ID matching the hashed IDs and thus, mistakenly consider itself as a recipient.

Since 2009, the Internet has been in a stage of its evolution in which the backbone (routers and servers) was connected to end nodes formed primarily by personal computers. At that time, Kevin Ashton (among others) looked ahead to the next stage in the Internet's evolution, which he described as the Internet of Things (IoT). In his article, "That 'Internet of Things' Thing," RFID Journal, Jul. 22, 2009, he describes the circa-2009-Internet as almost wholly dependent upon human interaction. He asserts that nearly all of the data then available on the internet was generated by data-capture/data-creation chains of events, each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or a man-made object which is assigned with a unique ID/address and which is configured with the ability to capture and/or create data and transfer that data over a network. Relative to the IoT, a thing can be e.g., a person with a heart monitor implant, a farm animal with a biochip transponder, an automobile that has built-in sensors to alert the driver when tire pressure is low, field-operation devices that assist fire-fighters in search and rescue, personal biometric monitors woven into clothing that continuously and imperceptibly interact with thermostat systems and lighting systems to control HVAC and illumination conditions in a room, a refrigerator that is "aware" of its suitably tagged contents that can both plan a variety of menus from the food actually present therein and warn users of stale or spoiled food, and the like.

Within the small-device segment, the sub-segment that has the greatest growth-potential is the embedded low-power wireless devices. Networks of such devices are described as comprising the Wireless Embedded Internet (WET) which is a subset of IoT. More particularly, the WET end nodes include resource-limited embedded devices which are typically battery powered, and which are typically connected to form a network based on technologies such as low-power low-bandwidth wireless networks (LoWPANs) or LoRaWAN™ (LoRaWAN is a trademark of the LoRa Alliance of Beaverton, Oreg., U.S.A.).

By combining low-energy usage with long-range communication, both LoWPAN and LoRaWAN™ may be promising in providing connectivity suitable for large-scale, low-power, and low-cost IoT deployment with long battery lives such as up to ten years. The 2016 Cisco VNI 2015-2020 data traffic forecast estimates that the share of Low Power Wide Area networks in global machine-to-machine connections will grow from 4% in 2015 to 28% in 2020.

Those skilled in this art assumed that Moore's law would advance computing and communication capabilities so rapidly that soon any embedded device could implement IP protocols. However, this has not proven true for cheap low-power microcontrollers and low-power wireless radio technologies. The vast majority of simple embedded devices still make use of 8-bit and 16-bit microcontrollers with very limited memory because they are low-power, small, and cheap. Also, the physical trade-offs of wireless technologies have resulted in short-range low-power wireless radios which have limited data rates, frame sizes, and duty cycles, e.g., as in the IEEE 802.15.4 standard.

Consequently, most of the WET contains embedded devices having limited computation capability and communication resources. The communication between a central node and the end-node devices also suffers from such limitations.

SUMMARY

Embodiments herein disclose methods of a communication or network system such as a wireless communication system and more particularly a wireless communication system operating in an unlicensed spectrum having at least one central-node device and a plurality of end-node devices. Each end-node device has a unique multicast identification (ID).

A sender such as a central-node device may generate a message and send the generated message to a plurality of recipient devices such as a plurality of end-node devices via a network of the system. Such as a message may be a multicast or a broadcast message, and may contain one or more recipient codewords embedded or encapsulated there representing encoded multicast IDs of the recipient devices in the payload. Therefore, such as message may be denoted as a "condensed multicast message" hereinafter.

With encoding, the multicast IDs of the recipient devices (denoted as "recipient multicast IDs" hereinafter), are losslessly transformed into one or more recipient codewords having a shortened total length shorter than that of the recipient multicast IDs and requiring less bandwidth for transmission. Herein, the term "lossless" or "losslessly" means that, one can retrieve the same set of recipient multicast IDs from the recipient codewords, and therefore when receiving a condensed multicast message, a device can unambiguously determine whether or not it is a recipient device that the message is intended to send to.

As is known in the art, a multicast or broadcast message may be received by a plurality of devices (denoted as "listener devices" or "listeners" hereinafter). Some listener devices are recipient devices that the message is intended to send to, and others are not. When receiving a condensed multicast message, a listener extracts and decodes the one or more recipient codewords and determines whether or not the listener device is a recipient. If the listener device is a recipient, the device further processes the message such as extracting data from the message. If the listener device is not a recipient, the listener device then discards the message.

According to one aspect of this disclosure, the embodiments herein disclose methods of operating a central-node device to encode the IDs of recipients, encapsulating data together with the encoded IDs into the payload of a message, and broadcasting/multicasting the message to a plurality of end-node devices. The embodiments herein also disclose methods of operating an end-node device to decode the IDs of recipients from a received multicast or broadcast message, and recognizing whether the end-node device itself is among the recipients of the multicast message.

According to one aspect of this disclosure, there is provided a method of generating a multicast message. The method comprises: losslessly encoding the ID of a plurality of recipient devices into one or more codewords, the total length of the one or more codewords being shorter than that of the IDs of the plurality of recipient devices; and encapsulating the codewords into the payload of the multicast message.

In some embodiments, the method further comprises: transmitting the generated multicast message via a network.

According to one aspect of this disclosure, there is provided a method of generating a message and transmitting the generated message to a plurality of recipient devices via a network. The method comprises: obtaining a plurality of recipient multicast identifications (IDs) for the plurality of recipient devices; losslessly encoding the recipient multicast IDs into one or more codewords, the total length of the one or more codewords being shorter than that of the recipient multicast IDs; generating the message by encapsulating at least the one or more codewords into a payload of the message; and transmitting the generated message to the network.

In some embodiments, at least one of the recipient multicast IDs represents one of the plurality of recipient devices.

In some embodiments, at least one of the recipient multicast IDs represents more than one of the plurality of recipient devices.

In some embodiments, said losslessly encoding the recipient multicast IDs into the one or more codewords comprises: transforming each recipient multicast ID into a minterm Boolean function; forming at least one recipient Boolean function as a logic sum of the minterms; simplifying the at least one recipient Boolean function to obtain at least one simplified recipient Boolean function; and encoding each of the at least one simplified recipient Boolean function to obtain the one or more codewords.

In some embodiments, said encoding each of the at least one simplified recipient Boolean function to obtain the one or more codewords comprises: representing each of the at least one simplified recipient Boolean function as a binary-tree data structure; and converting the binary-tree data structure into one of the one or more codewords.

In some embodiments, the one of the one or more codewords is a binary codeword.

In some embodiments, said simplifying the at least one recipient Boolean function comprises: representing each recipient Boolean function as a binary decision diagram (BDD); and converting each BDD into a reduced ordered binary decision diagram (ROBDD). Said encoding each of the at least simplified recipient Boolean function to obtain the one or more codewords comprises: encoding each ROBDD into one of the one or more codewords.

In some embodiments, said generating the message further comprises encapsulating data into the payload of the message.

In some embodiments, each recipient device comprises a device ID; and the method further comprises: obtaining a list of device IDs of the recipient devices; and obtaining the plurality of recipient multicast IDs based on the list of device IDs.

In some embodiments, the network has a star topology.

In some embodiments, the network is a wireless network.

According to one aspect of this disclosure, there is provided a method of operating a device for receiving a multicast or broadcast message. The method comprises: extracting a payload from the message; extracting one or more codewords from the payload; processing the extracted one or more codewords to obtain a representation of a plurality of recipient multicast IDs; comparing the representation with a listener multicast ID of the device to determine whether or not the device is a recipient of the message; and further processing the message if the device is a recipient of the message.

In some embodiments, the method further comprises: discarding the message if the device is not a recipient of the message.

In some embodiments, the representation is a Boolean function; and said comparing the representation with the listener multicast ID comprises: calculating a value of the Boolean function using the listener multicast ID; determining that the device is a recipient of the message if the calculated value is one; and determining that the device is not a recipient of the message if the calculated value is zero.

In some embodiments, said processing the extracted one or more codewords to obtain the representation of the plurality of recipient multicast IDs comprises, for each codeword, extracting structure data of a ROBDD from the codeword. Said comparing the representation with the listener multicast ID comprises: extracting one or more codeword segments from the codeword based on the bits of the listener multicast ID; and parsing the extracted codeword segments one by one to determine whether or not the device is a recipient of the message.

In some embodiments, said processing the extracted one or more codewords to obtain the representation of the plurality of recipient multicast IDs comprises extracting a ROBDD from each codeword. Said comparing the representation with the listener multicast ID comprises: traversing the extracted ROBDD from a top level thereof following a path determined by the value of the listener multicast ID to determine whether or not the device is a recipient of the message.

In some embodiments, the device is in a group having a group multicast ID; and the method further comprises: comparing the representation with the group multicast ID to determine whether or not the group is a recipient of the message; further processing the message, if the group is a recipient of the message; and performing said comparing the representation with the listener multicast ID, if the group is not a recipient of the message.

According to one aspect of this disclosure, there is provided a system comprising: at least one sender device and a plurality of listener devices interconnected via a network. Each listener device comprises a multicast ID. The sender device is configured for: obtaining a plurality of recipient multicast IDs for a plurality of recipient devices, said plurality of recipient devices being at least a subset of the listener devices; losslessly encoding the recipient multicast IDs into one or more codewords, the total length of the one or more codewords being shorter than that of the recipient multicast IDs; generating the message by encapsulating at least the one or more codewords into a payload of the message; and transmitting the generated message via the network.

In some embodiments, said losslessly encoding the recipient multicast IDs into the one or more codewords comprises: transforming each recipient multicast ID into a minterm Boolean function; forming at least one recipient Boolean function as a logic sum of the minterms; simplifying the at least one recipient Boolean function to obtain at least one simplified recipient Boolean function; and encoding each of the at least one simplified recipient Boolean function to obtain the one or more codewords.

In some embodiments, said encoding each of the at least one simplified recipient Boolean function to obtain the one or more codewords comprises: representing each of the at least one simplified recipient Boolean function as a binary-tree data structure; and converting the binary-tree data structure into one of the one or more codewords.

In some embodiments, said simplifying the at least one recipient Boolean function comprises: representing each recipient Boolean function as a BDD; and converting each BDD into a ROBDD. Said encoding each of the at least one simplified recipient Boolean function to obtain the one or more codewords comprises: encoding each ROBDD into one of the one or more codewords.

In some embodiments, each of one or more listener devices is configured for: receiving the message; extracting the payload from the message; extracting the one or more codewords from the payload; processing the extracted one or more codewords to obtain a representation of the plurality of recipient multicast IDs; comparing the representation with a listener multicast ID of the listener device to determine whether or not the listener device is a recipient of the message; and further processing the message if the listener device is a recipient of the message.

In some embodiments, each of the one or more listener devices is further configured for: discarding the message if the listener device is not a recipient of the message.

In some embodiments, the representation is a Boolean function; and said comparing the representation with the listener multicast ID of the listener device comprises: calculating a value of the Boolean function using the multicast ID; determining that the listener device is a recipient of the message if the calculated value is one; and determining that the listener device is not a recipient of the message if the calculated value is zero.

In some embodiments, said processing the extracted one or more codewords to obtain the representation of the plurality of recipient multicast IDs comprises, for each codeword, extracting structure data of a ROBDD from the codeword. Said comparing the representation with the listener multicast ID of the listener device comprises: extracting one or more codeword segments from the codeword based on the bits of the listener multicast ID; and parsing the extracted codeword segments one by one to determine whether or not the listener device is a recipient of the message.

In some embodiments, said processing the extracted one or more codewords to obtain the representation of the plurality of recipient multicast IDs comprises extracting a ROBDD from each codeword. Said comparing the representation with the listener multicast ID of the listener device comprises: traversing the extracted ROBDD from a top level thereof following a path determined by the value of the listener multicast ID to determine whether or not the listener device is a recipient of the message.

In some embodiments, the listener device is in a group having a group multicast ID; and the listener device is further configured for: comparing the representation with the group multicast ID to determine whether or not the group is a recipient of the message; further processing the message, if the group is a recipient of the message; and performing said comparing the representation with the listener multicast ID, if the group is not a recipient of the message.

According to one aspect of this disclosure, there is provided a device comprising: a memory; a network interface functionally connectable to a network; and a processing structure functionally coupled to the memory and the network interface. The processing structure is configured for: obtaining a plurality of recipient multicast IDs for a plurality of recipient devices in the network; losslessly encoding the recipient multicast IDs into one or more codewords, the total length of the one or more codewords being shorter than that of the recipient multicast IDs; generating a message by encapsulating at least the one or more codewords into a payload of the message; and transmitting the generated message via the network interface to the network.

In some embodiments, said losslessly encoding the recipient multicast IDs into the one or more codewords comprises: transforming each recipient multicast ID into a minterm Boolean function; forming at least one recipient Boolean function as a logic sum of the minterms; simplifying the at least one recipient Boolean function to obtain at least one simplified recipient Boolean function; and encoding each of the at least one simplified recipient Boolean function to obtain the one or more codewords.

According to one aspect of this disclosure, there is provided a device comprising: a memory; a network interface functionally connectable to a network; and a processing structure functionally coupled to the memory and the network interface. The processing structure is configured for: receiving a message; extracting a payload from the message; extracting one or more codewords from the payload; processing the extracted one or more codewords to obtain a representation of a plurality of recipient multicast IDs; comparing the representation with a listener multicast ID of the device to determine whether or not the device is a recipient of the message; and further processing the message if the device is a recipient of the message.

In some embodiments, the processing structure is further configured for: discarding the message if the device is not a recipient of the message.

In some embodiments, the representation is a Boolean function; and said comparing the representation with the listener multicast ID of the device comprises: calculating a value of the Boolean function using the listener multicast ID; determining that the device is a recipient of the message if the calculated value is one; and determining that the device is not a recipient of the message if the calculated value is zero.

According to one aspect of this disclosure, there is provided one or more non-transitory computer-readable storage media comprising computer-executable instructions for generating a message and transmitting the generated message to a plurality of recipient devices via a network. The instructions, when executed, cause a processor to perform actions comprising: obtaining a plurality of recipient multicast IDs for the plurality of recipient devices; losslessly encoding the recipient multicast IDs into one or more codewords, the total length of the one or more codewords being shorter than that of the recipient multicast IDs; generating the message by encapsulating at least the one or more codewords into a payload of the message; and transmitting the generated message to the network.

According to one aspect of this disclosure, there is provided one or more non-transitory computer-readable storage media comprising computer-executable instructions for receiving a multicast or broadcast message from a network. The instructions, when executed, cause a processor of a device to perform actions comprising: extracting a payload from the message; extracting one or more codewords from the payload; processing the extracted one or more codewords to obtain a representation of a plurality of recipient multicast IDs; comparing the representation with a listener multicast ID of the device to determine whether or not the device is a recipient of the message; and further processing the message if the device is a recipient of the message.

According to one aspect of this disclosure, there is provided a message-communication method comprising at least one of a message-transmission process and a message-receiving process.

The message-transmission process comprises: obtaining a plurality of first multicast identifications (IDs) for a plurality of first devices in a network; losslessly encoding the first multicast IDs into one or more first codewords, the total length of the one or more first codewords being shorter than that of the first multicast IDs; generating a first message by encapsulating at least the one or more first codewords into a first payload of the message; and transmitting the generated first message to the network.

The message-receiving process comprises: receiving a second message; extracting a second payload from the second message; extracting one or more second codewords from the second payload; processing the extracted one or more second codewords to obtain a representation of a plurality of second multicast IDs; comparing the representation with a listener multicast ID of a second device to determine whether or not the second device is a recipient of the second message; and further processing the second message if the second device is a recipient of the second message.

In some embodiments, the message-receiving process comprises: discarding the second message if the second device is not a recipient of the second message.

In some embodiments, at least one of the first multicast IDs represents one of the first devices.

In some embodiments, at least one of the first multicast IDs represents more than one of the first devices.

In some embodiments, said losslessly encoding the first multicast IDs into the one or more first codewords comprises: transforming each first multicast ID into a minterm Boolean function; forming at least one recipient Boolean function as a logic sum of the minterms; simplifying the at least one recipient Boolean function to obtain at least one simplified recipient Boolean function; and encoding each of the at least one simplified recipient Boolean function to obtain the one or more first codewords.

In some embodiments, said encoding each of the at least one simplified recipient Boolean function to obtain the one or more first codewords comprises: representing each of the at least one simplified recipient Boolean function as a binary-tree data structure; and converting the binary-tree data structure into one of the one or more first codewords.

In some embodiments, said simplifying the at least one recipient Boolean function comprises: representing each recipient Boolean function as a binary decision diagram (BDD); and converting each BDD into a reduced ordered binary decision diagram (ROBDD). Said encoding each of the at least simplified recipient Boolean function to obtain the one or more first codewords comprises: encoding each ROBDD into one of the one or more first codewords.

In some embodiments, the representation is a Boolean function; and said comparing the representation with the listener multicast ID of the second device comprises: calculating a value of the Boolean function using the listener multicast ID; determining that the second device is a recipient of the second message if the calculated value is one; and determining that the second device is not a recipient of the second message if the calculated value is zero.

In some embodiments, said processing the extracted one or more second codewords to obtain the representation of the plurality of second multicast IDs comprises extracting a ROBDD from each second codeword. Said comparing the representation with the listener multicast ID comprises: traversing the extracted ROBDD from a top level thereof following a path determined by the value of the listener multicast ID to determine whether or not the second device is a recipient of the second message.

In some embodiments, the second device is in a group having a group multicast ID; and the message-receiving process further comprises: comparing the representation with the group multicast ID to determine whether or not the group is a recipient of the second message; further processing the second message, if the group is a recipient of the second message; and performing said comparing the representation with the listener multicast ID, if the group is not a recipient of the second message.

According to one aspect of this disclosure, there is provided a device comprising: a memory; a network interface functionally connectable to a network; and a processing structure functionally coupled to the memory and the network interface. The processing structure is configured for performing at least one of a message-transmission process and a message-receiving process.

The message-transmission process comprises: obtaining a plurality of first multicast IDs for a plurality of first devices in the network; losslessly encoding the first multicast IDs into one or more first codewords, the total length of the one or more first codewords being shorter than that of the first multicast IDs; generating a first message by encapsulating at least the one or more first codewords into a first payload of the first message; and transmitting the generated first message via the network interface to the network.

The message-receiving process comprises: receiving a second message; extracting a second payload from the second message; extracting one or more second codewords from the second payload; processing the extracted one or more second codewords to obtain a representation of a plurality of second multicast IDs; comparing the representation with a listener multicast ID of the device to determine whether or not the device is a recipient of the second message; and further processing the second message if the device is a recipient of the second message.

In some embodiments, the message-receiving process further comprises: discarding the second message if the device is not a recipient of the second message.

In some embodiments, at least one of the first multicast IDs represents one of the plurality of first devices.

In some embodiments, at least one of the first multicast IDs represents more than one of the plurality of first devices.

In some embodiments, said losslessly encoding the first multicast IDs into the one or more first codewords comprises: transforming each first multicast ID into a minterm Boolean function; forming at least one recipient Boolean function as a logic sum of the minterms; simplifying the at least one recipient Boolean function to obtain at least one simplified recipient Boolean function; and encoding each of the at least one simplified recipient Boolean function to obtain the one or more first codewords.

In some embodiments, said encoding each of the at least one simplified recipient Boolean function to obtain the one or more first codewords comprises: representing each of the at least one simplified recipient Boolean function as a binary-tree data structure; and converting the binary-tree data structure into one of the one or more first codewords.

In some embodiments, said simplifying the at least one recipient Boolean function comprises: representing each recipient Boolean function as a BDD; and converting each BDD into a ROBDD. Said encoding each of the at least simplified recipient Boolean function to obtain the one or more first codewords comprises: encoding each ROBDD into one of the one or more first codewords.

In some embodiments, the representation is a Boolean function; and said comparing the representation with the listener multicast ID of the device comprises: calculating a value of the Boolean function using the listener multicast ID; determining that the device is a recipient of the message if the calculated value is one; and determining that the device is not a recipient of the message if the calculated value is zero.

In some embodiments, said processing the extracted one or more second codewords to obtain the representation of the plurality of second multicast IDs comprises extracting a ROBDD from each second codeword. Said comparing the representation with the listener multicast ID of the device comprises: traversing the extracted ROBDD from a top level thereof following a path determined by the value of the listener multicast ID, to determine whether or not the device is a recipient of the message.

In some embodiments, the device is in a group having a group multicast ID; and the message-receiving process further comprises: comparing the representation with the group multicast ID to determine whether or not the group is a recipient of the second message; further processing the second message, if the group is a recipient of the second message; and performing said comparing the representation with the listener multicast ID, if the group is not a recipient of the second message.

According to one aspect of this disclosure, there is provided one or more non-transitory computer-readable storage media comprising computer-executable instructions. The instructions, when executed, cause a processor to perform at least a first set of actions and a second set of actions.

The first set of actions comprises: obtaining a plurality of first multicast identifications (IDs) for a plurality of first devices in a network; losslessly encoding the first multicast IDs into one or more first codewords, the total length of the one or more first codewords being shorter than that of the first multicast IDs; generating a first message by encapsulating at least the one or more first codewords into a first payload of the message; and transmitting the generated first message to the network.

The second set of actions comprises: receiving a second message; extracting a second payload from the second message; extracting one or more second codewords from the second payload; processing the extracted one or more second codewords to obtain a representation of a plurality of second multicast IDs; comparing the representation with a listener multicast ID of a second device to determine whether or not the second device is a recipient of the second message; and further processing the second message if the second device is a recipient of the second message.

In some embodiments, the second set of actions further comprises: discarding the second message if the second device is not a recipient of the second message.

BRIEF DESCRIPTION OF THE DRAWINGS

For a more complete understanding of the disclosure, reference is made to the following description and accompanying drawings, in which:

FIGS. 13 to 14E show an example of generating and transmitting a condensed multicast message, according to some embodiments of this disclosure, wherein FIG. 13 shows a plurality of end-node devices in a multicast group, FIG. 14A shows the device IDs of a subset of the end-node devices shown in FIG. 13 which are the recipient devices of the a condensed multicast message to be sent from the central-node device, FIG. 14B shows the multicast IDs of the recipient devices shown in FIG. 14A, FIG. 14C shows a recipient Boolean function of the recipient multicast IDs shown in FIG. 14B, FIG. 14D shows a reduced-order Boolean function obtained from the recipient Boolean function shown in FIG. 14C, and FIG. 14E shows a binary codeword of the reduced-order Boolean function shown in FIG. 14D;

FIGS. 18 to 20D show some simulation results of the system shown in FIG. 1 in generating and transmitting condensed multicast messages, wherein FIG. 18 shows the simulation results in pure-random scenario, FIGS. 20A to 20D show the simulation results in a random-sets scenario;

DETAILED DESCRIPTION

Embodiments herein disclose a system and method of network communications using condensed multicast messages. As those skilled in the art appreciate, in network communications, a sender or message-transmission device may send one or more messages to a plurality of recipients or recipient devices.

The word "network" is used herein to mean one or more conventional or proprietary networks using an appropriate network data transmission protocol. Examples of such networks include, PSTN, LAN, WAN, WI-FI® (WI-FI is a registered trademark of the City of Atlanta DBA Hartsfield-Jackson Atlanta International Airport Municipal Corp., Atlanta, Ga., USA), WIMAX™ (WIMAX is a trademark of WiMAX Forum of Clackamas, Oreg., U.S.A.), Internet, World Wide Web, Ethernet, other wireless networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

Herein, the term "recipient" or "recipient device" refers to a device such as an end-node device that a sender such as a central-node device intends to send a message thereto. As is known in the art, a message such as a multicast message sent by a sender may be received by a plurality of devices, each of which is denoted as a listener or a listener device. While some of these listener devices may be recipients that the sender intends to send the message thereto, others are not the recipients and shall discard the received message. Therefore, the process of determining that a listener device is not the recipient of a multicast message may be as significant as the process of determining that a listener device is a recipient of a multicast message.

Accordingly, when a sender sends a multicast message, the sender embeds the multicast IDs of all recipients into the payload of the multicast message to facilitate each end-node device to unambiguously decide whether or not its ID is in the list of recipient IDs.

In the system disclosed herein, the sender encodes the multicast IDs into one or more codewords to form a condensed multicast message. As of the total length of the encoded multicast IDs is shorter than that of the multicast IDs, the system disclosed herein has an advantage of conserving the wireless bandwidth for transmitting multicast messages and the reduced message size may save transmission time and energy.

Figure 1:
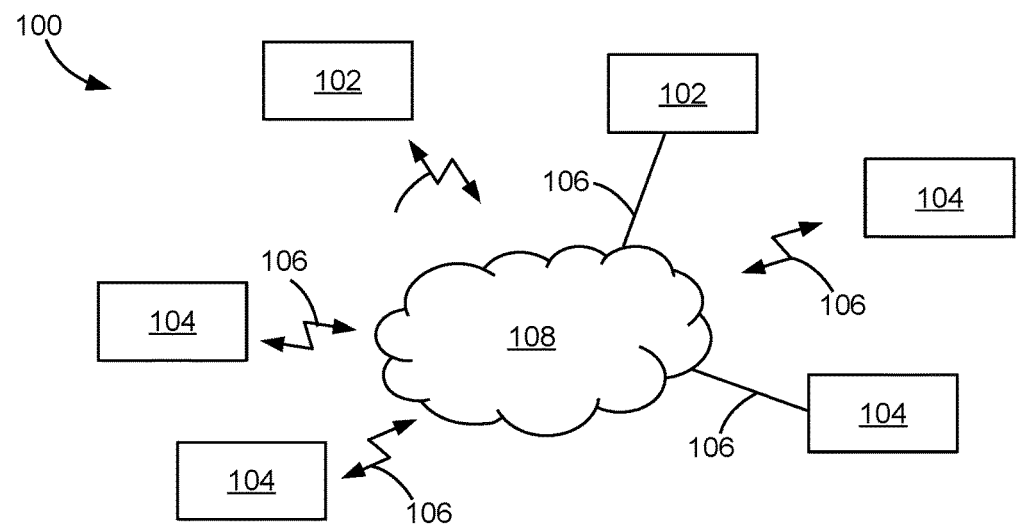
FIG. 1 is a block diagram of a network system such as a long-range low-power network system, according to some embodiments of this disclosure.

Turning now to FIG. 1, a network system in some embodiments is shown and is generally identified using reference numeral 100. The network system 100 in these embodiments is a long-range low-power network system having a star topology and is compatible with relevant standards such as the 6LoWPAN standard, the LoRaWAN™ standard, and/or the like.

As shown, the network system 100 comprises one or more central-node devices 102 such as a base station and a plurality of end-node devices 104 interconnected through a network 108 via suitable wired or wireless communication methods. Depending on the implementation, a central-node device 102 may be a serve computer, a base station, a gateway, and/or the like that manages all or a subset of the end-node devices 104. The end-node devices 104 may be computers, cameras, lights, temperature controllers, switches, fans, sensors, alarms, and/or the like with necessary network functionalities. The network 108 may comprise necessary infrastructure and devices such as one or more routers, gateways, access points, network switches, repeaters, and the like.

Each end-node device 104 is associated with the central-node device 102, and is in communication therewith via a communication session 106. Some or all end-node devices 104 may be configured to be controlled by the central-node device 102. For example, the central-node device 102 may send a data message having one or more instructions therein to an end-node device 104. The end-node device 104 receives the data message from the central-node device 102 and changes its internal state in response to the instructions in the data message.

Figure 2:
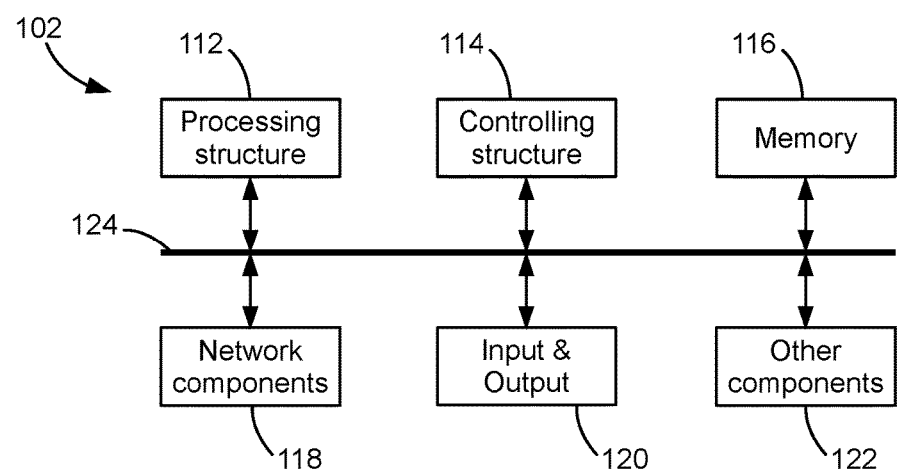
FIG. 2 is a block diagram showing the hardware structure of a central-node device of the network system shown in FIG. 1.

FIG. 2 is a block diagram showing the hardware structure of a central-node device 102. The central-node device 102 comprises a processing structure 112, a controlling structure 114, a memory 116, one or more network components 118, input and output components 120, and other components 122, interconnected via a suitable circuit or a system bus 124.

The processing structure 112 may comprises one or more processors which may be one or more central processing units (CPUs), one or more microprocessors, one or more real-time processing units, and/or the like, such as INTEL® microprocessors (INTEL is a registered trademark of Intel Corp., Santa Clara, Calif., USA), AMD® microprocessors (AMD is a registered trademark of Advanced Micro Devices Inc., Sunnyvale, Calif., USA), ARM® microprocessors (ARM is a registered trademark of Arm Ltd., Cambridge, UK) manufactured by a variety of manufactures such as Qualcomm of San Diego, Calif., USA, under the ARM® architecture, or the like.

While it may be rarely seen, the one or more processors of the central-node device 102 in some alternative embodiments may be one or more specially-designed processing structures using FPGAs, one or more ASICs, and/or the like.

The controlling structure 114 comprises a plurality of controllers such as graphic controllers, input/output chipsets and the like, for coordinating operations of various hardware components and modules of the central-node device 102.

The memory 116 comprises a plurality of memory units accessible by the processing structure 112 and the controlling structure 114 for reading and/or storing data, including input data and data generated by the processing structure 112 and the controlling structure 114 during operation. The memory 116 may be volatile and/or non-volatile, non-removable or removable memory such as RAM, ROM, EEPROM, solid-state memory, hard disks, CD, DVD, flash memory, or the like. In use, the memory 116 is generally divided to a plurality of portions for different use purposes. For example, a portion of the memory 116 (denoted as storage memory herein) may be used for long-term data storing, for example, storing files or databases. Another portion of the memory 116 may be used as the system memory for storing data during processing (denoted as working memory herein).

The central-node device 102 comprises one or more network components 118 for interconnecting with other devices. For example, the one or more network components 118 in these embodiments comprises a wireless networking interface for communicating with end-node devices 104 using suitable low-power wireless communication technologies such as those in compliance with relevant standards such as the 6LoWPAN standard, the LoRaWAN™ standard, and/or the like. The one or more network components 118 may also comprise other suitable wired or wireless communication components for interconnecting with other computing devices or networks using suitable wired or wireless communication technologies such as Ethernet, WI-FI®, BLUETOOTH® (BLUETOOTH is a registered trademark of Bluetooth Sig Inc., Kirkland, Wash., USA), ZIGBEE® (ZIGBEE is a registered trademark of ZigBee Alliance Corp., San Ramon, Calif., USA), 3G and 4G wireless mobile telecommunications technologies, and/or the like. In some embodiments, parallel ports, serial ports, USB connections, optical connections, or the like may also be used for connecting other computing devices or networks although they are usually considered as input/output interfaces for connecting input/output devices.

The central-node device 102 may comprise one or more input and output components 120 such as a keyboard, a computer mouse, a microphone, one or more displays, speakers, printers, touch-sensitive screens, and the like.

The central-node device 102 may also comprise other components 122 such as a Graphic Processing Unit (GPU), a Global Positioning System (GPS) component, sensors, and the like, although these components may alternatively categorized into the processing structure or input and output components.

Figure 3:
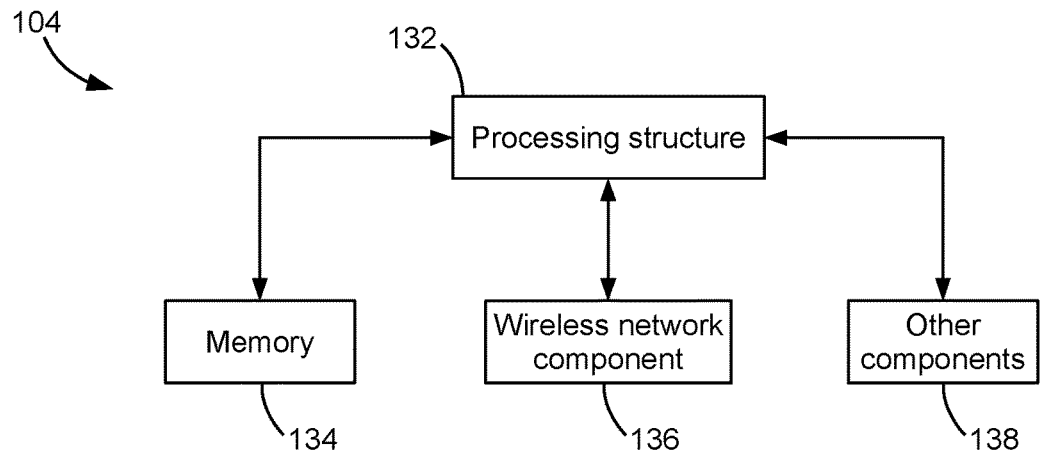
FIG. 3 is a block diagram showing the hardware structure of an end-node device of the network system shown in FIG. 1.

FIG. 3 is a block diagram showing the hardware structure of an end-node device 104. The end-node device 104 comprises a processing structure 132, a memory 134, one or more wireless network components 136, and other components 138, interconnected via a suitable circuit or a system bus.

The processing structure 132 may comprise one or more processors which may be one or more specially-designed processing units using field-programmable gate arrays (FPGAs), one or more application-specific integrated circuits (ASICs), one or more microprocessors, one or more real-time processing units, one or more CPUs, and/or the like. Examples of the one or more processors 108 include but not limited to as INTEL® microprocessors, AMD® microprocessors, ARM® microprocessors manufactured by a variety of manufactures such as Qualcomm of San Diego, Calif., USA, under the ARM® architecture, or the like.

The memory 134 comprises one or more memory units accessible by the processing structure 132 for reading and/or storing data, including input data and data generated by the processing structure 132. The memory 134 may be volatile and/or non-volatile, non-removable or removable memory such as RAM, ROM, EEPROM, solid-state memory, hard disks, CD, DVD, flash memory, or the like.

The end-node device 104 comprises one or more wireless network components 136 for interconnecting with the central-node device 102 and optionally with other end-node devices 104 using suitable low-power wireless communication technologies such as those in compliance with relevant standards such as the 6LoWPAN standard, the LoRaWAN™ standard, and/or the like.

The end-node device 104 may also comprise other components 138 such as one or more sensors, one or more alarms, one or more controllers, and/or the like.

On the software side, each of the central-node devices 102 and the end-node device 104 comprises machine-readable code or instructions in the form of one or more software or firmware programs stored in the memory 116/134 and executable by the processing structure 112/132 for performing necessary functions.

Figure 4:
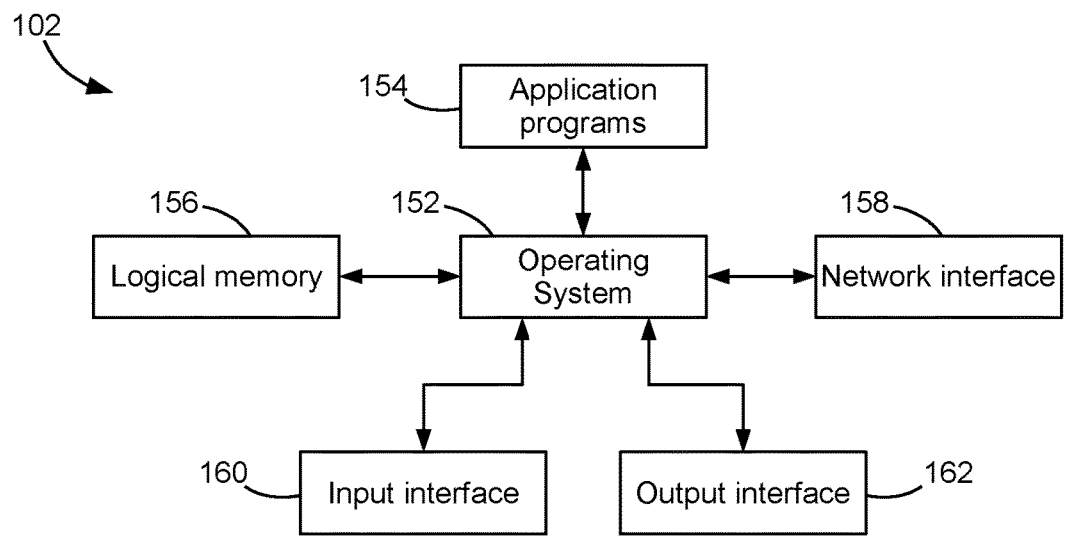
FIG. 4 is a block diagram showing a simplified functional or software structure of the central-node device shown in FIG. 2.

FIG. 4 is a block diagram showing a simplified functional or software structure of a central-node device 102. As shown, the central-node device 102 comprises an operating system 152, one or more application programs 154, a logical memory 156, a network interface 158, an input interface 160, and an output interface 162.

The operating system 152 manages various hardware components of the central-node device 102 via the network interface 158, the input interface 160, and the output interface 162, manages the logical memory 156, and manages and supports the application programs 154.

As those skilled in the art will appreciate, the operating system 152 may be any suitable operating system such as MICROSOFT® WINDOWS® (MCROSOFT and WINDOWS are registered trademarks of the Microsoft Corp., Redmond, Wash., USA), APPLE® OS X, APPLE® iOS (APPLE is a registered trademark of Apple Inc., Cupertino, Calif., USA), Linux, ANDROID® (ANDRIOD is a registered trademark of Google Inc., Mountain View, Calif., USA), CISCO® IOS® (CISCO and IOS are registered trademarks of CISCO Systems, Inc., San Jose, Calif., USA), or the like.

The one or more application programs 154 are executed or run by the processing structure 112 for performing various jobs.

The logical memory 156 is a logical mapping of the physical memory 116 for facilitating the operating system 152 and application programs 154 to access. In these embodiments, the logical memory 156 comprises a storage memory area that is usually mapped to non-volatile physical memory, such as hard disks, solid state disks, flash drives and the like, for generally long-term storing data therein. The logical memory 156 also comprises a working memory area that is generally mapped to high-speed, and in some implementations volatile, physical memory, such as RAM, for the operating system 152 and application programs 154 to generally temporarily store data during program execution. For example, an application program 154 may load data from the storage memory area into the working memory area, and may store data generated during its execution into the working memory area. The application program 154 may also store some data into the storage memory area as required or in response to a user's command.

The network interface 158 comprises one or more drivers for the network components 118 and other networking modules for performing necessary networking functionalities such as wired and/or wireless communications using 6LoWPAN, LoRaWAN™, TCP/IP, and/or the like.

The input interface 160 comprises one or more input device drivers for communicating with respective input devices, and the output interface 162 comprises one or more output device drivers for communicating with respective output devices. Input data received from the input devices via the input interface 160 may be processed by the operating system 152 and/or one or more application programs 164. The output generated by the operating system 152 and/or one or more application programs 164 is sent to respective output devices via the output interface 162.

In these embodiments, the end-node devices 104 have a simpler hardware structure compared to the central-node device 102. Accordingly, the end-node devices 104 also has a simpler software structure compared to the central-node device 102.

Figure 5:
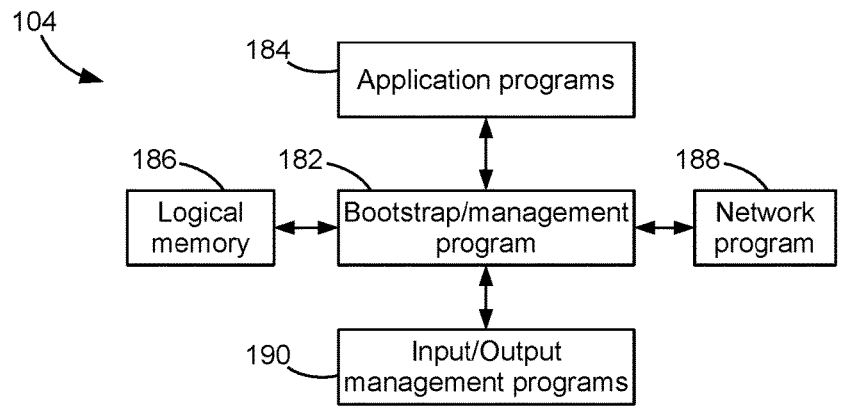
FIG. 5 is a block diagram showing a simplified functional or software structure of the end-node device shown in FIG. 3.

FIG. 5 shows a simplified functional or software structure of an end-node device 104. As shown, the end-node device 102 comprises a bootstrap/management program 182, one or more application programs 184, a logical memory 186, one or more network programs 188, and one or more input/output management programs 190.

The bootstrap/management program 182 is similar to the operating system 152 and manages various hardware components of the end-node device 104 via the network programs 188 and the input/output management programs 190, manages the logical memory 186, and manages and supports the application programs 184.

The logical memory 186 is a logical mapping of the physical memory 134 for facilitating the bootstrap/management program 182 and application programs 184 to access. However, the logical memory 186 may not be partitioned to a storage memory area and a working memory area.

The network program 188 manages the wireless network component 136 for performing necessary networking functionalities such as wireless communications using 6LoWPAN, LoRaWAN™, and/or the like.

The input and output management programs 190 manage input and output components such as sensors, alarms, and the like.

Figure 6:
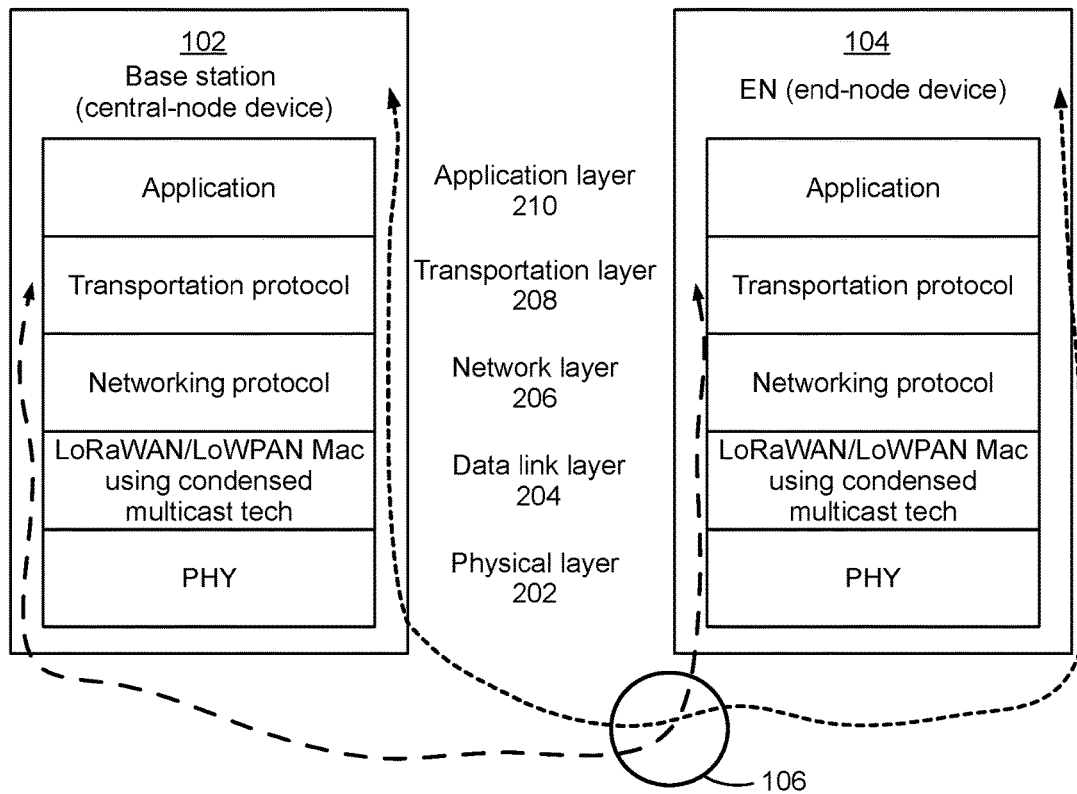
FIG. 6 shows a communication-layer diagram, illustrating the path of flow during a communication session between two devices such as a central-node device shown in FIG. 2 and an end-node device shown in FIG. 3.

FIG. 6 shows a communication-layer diagram with LoRaWAN™ or LoWPAN, illustrating the path of flow during a communication session 106 between two devices such as a central-node device 102 and an end-node device 104. As shown, the central-node device 102 and the end-node device 104 have a communication stack in compliance with the industry-standard communication layers or a portion thereof. On each of the central-node device 102 and the end-node device 104, the communication stack comprises a physical layer 202, a data link layer 204 which comprises a media access control (MAC) layer using a condensed message multicast technology (described in more detail later), a network layer 206 with user defined networking protocol, or with IPv4 or IPv6 protocol with LoWPAN, a transport layer 208 with user defined transport protocols, or with standard protocols such as User Datagram Protocol (UDP) or an Internet Control Message Protocol (ICMP), and an application layer 210. Those skilled in the art will appreciate that the communication stack may be partitioned into other combinations of layers in some alternative embodiments.

In system 100, a central-node device 102 (also denoted as a "sender" hereinafter) may send one or more messages to a plurality of end-node devices 106 (also denoted as "recipients" or "recipient devices" hereinafter). For example, a sender may send a multicast message to a subset of other devices in the system 100. A sender may also send a broadcast message to all other devices in the system 100.

In these embodiments, a multicast message comprises a list of recipient identities (IDs) each uniquely identifies a device. When a sender sends a multicast message, a plurality of devices (denoted as "listeners" hereinafter) in the system 100 may receive the multicast message, wherein some devices may be the intended recipients and other devices may not be the recipients. When a listener receives a multicast message, it checks the recipient list in the received message and determines whether or not the listener is a recipient. If the listener's ID is in the recipient ID list, the listener is a recipient and the listener then processes the received message to extract the data therein. If the listener's ID is not in the recipient ID list, the listener is not a recipient and the listener then discards the received message.

Herein, multicasting and broadcasting are not specifically differentiated as a broadcast message in some embodiments may also comprise a list of recipient IDs. In other words, the system and method disclosed herein is suitable for sending and receiving messages that comprise a list of recipient IDs wherein the messages may be multicast messages and/or broadcast messages. For ease of description, such messages are collectively denoted as multicast messages, and the process of sending such messages is collectively denoted as a multicasting process.

As will be described in more detail below, a central-node device 102 may send a multicast message with a condensed recipient ID list (also denoted as a "condensed multicast message") to a plurality of end-node devices 104. A condensed multicast message comprises one or more codewords representing a losslessly encoded, compressed or otherwise transformed list of recipient IDs such that the total length of the one or more codewords is shorter than that of the recipient IDs. Consequently, the length of the multicast message is reduced and therefore the bandwidth occupied by the list of recipient IDs is reduced.

When a listener receives a condensed multicast message, the listener decodes, decompresses, or otherwise reverse-transforms the one or more codewords in the condensed multicast message and determines whether or not the listener is a recipient. If the listener's ID is in the recipient ID list, the listener is a recipient and the listener then processes the received message to extract the data therein. If the listener's ID is not in the recipient ID list, the listener is not a recipient and the listener then discards the received message.

Figure 7:
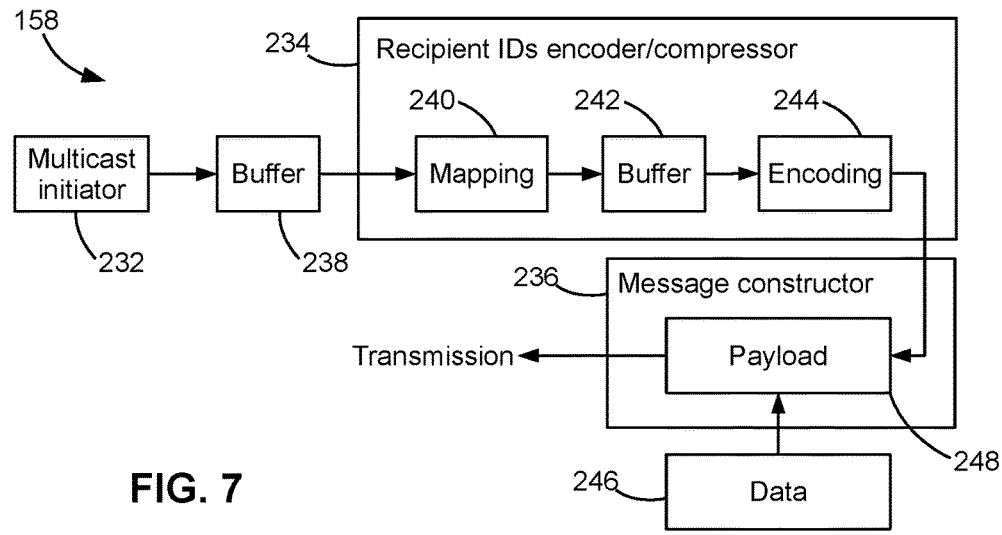
FIG. 7 shows a functional structure of a network interface of the central-node device shown in FIG. 2 for generating and transmitting a condensed multicast message.

FIG. 7 shows a functional structure of the network interface 158 of the central-node device 102 for generating and transmitting a condensed multicast message. As shown, the network interface 158 comprises a multicast initiator 232, a recipient IDs encoder/compressor (also denoted as a "RIDs encoder" hereinafter) 234, and a message constructor 236. Those skilled in the art will appreciate that the functions shown in FIG. 7 may be implemented in other software modules such as the operating system 152 of the central-node device 102.

Figure 8:
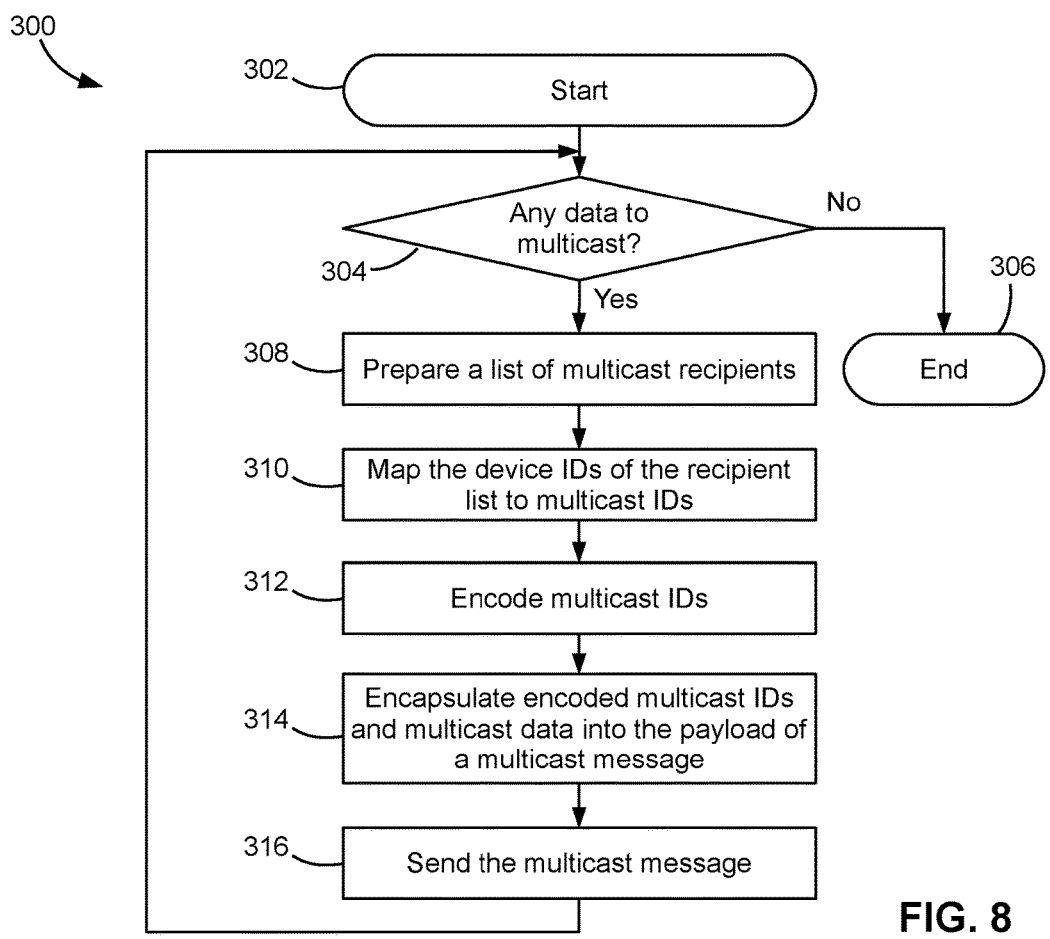
FIG. 8 shows a flowchart of a process executed by a sender device for generating and sending a condensed multicast message.

FIG. 7 is now described together with FIG. 8 which shows a flowchart of a process 300 of generating and sending a condensed multicast message.

Those skilled in the art will appreciate that each device 102, 104 in the system 100 comprises at least one identity (ID) such as a MAC address, an IP address, and/or the like, that uniquely identifies the device (collectively denoted as a "device ID" hereinafter).

To accommodate different numbers of end-node devices 104, the system 100 may use one or more broadcast channels in proportional to the number of end-node devices 104. Each broadcast channel corresponds to a multicast group.

In these embodiments, each end-node device 104 in a multicast group is assigned a unique multicast ID, and the central-node device 102 stores a copy of the multicast IDs of the multicast group. As the multicast group may only comprise a limited number of end-node devices 104, the length of each multicast ID may be much shorter than that of the device ID.

To generate and transmit a condensed multicast message, a sender which may be the central-node device 102 starts the process 300 (step 302), the sender checks if there is any data to multicast (step 304). If no data is to multicast, the process is terminated (step 306). If there is some data to multicast, then the multicast initiator 232 of the sender prepares a list of recipient devices for multicasting (step 308). The recipient list comprises the device IDs of the recipient devices and is stored in a first buffer 238.

At step 310, a mapping module 240 of the recipient ID encoder/compressor 234 reads the recipient list from the first buffer 238 and maps each device ID in the recipient list to the corresponding multicast ID. The obtained multicast IDs are then stored in a second buffer 242.

At step 312, an encoding module 244 reads the multicast IDs from the second buffer 242 and losslessly encodes or compresses the multicast IDs into one or more recipient codewords. The obtained recipient codewords are sent to the message constructor 236.

At step 314, the message constructor 236 encapsulates the recipient codewords and the multicast data 246 into the payload 248 of a multicast message to form a condensed multicast message. At this step, the message constructor 236 also attaches a header to the payload 248. The header comprises the sender's ID and channel information.

At step 316, the generated message is transmitted through the wireless communication session 106 to the multicast group. Then, the process 300 loops back to step 304 to check if there is any other data to multicast.

In these embodiments, each multicast ID is a k-bit binary word assigned by a management device such as a central-node device 102. Generally, in a multicast group of N devices (N is a positive integer), $$k \geq \lceil \log_2 N \rceil, \quad (1)$$

where [x] represents rounding up x to the nearest integer. For example, k may be between 1 and 32 depending on N. In some embodiments, k may be dynamically adjustable according to the number of end-node devices currently joining in a multicast group. For example, a central node 102 may multicast an adjust-k instruction using a conventional multicast message (i.e., without encoding multicast IDs) to all end-node devices 104 in a multicast group.

A sender may send a condensed multicast message to L recipient devices (L≤N) in the multicast group. The sender device losslessly encodes or compresses the multicast IDs of the L recipient devices into one or more recipient codewords, and encapsulates the recipient codewords into the payload 248 of a multicast message.

Figure 9:
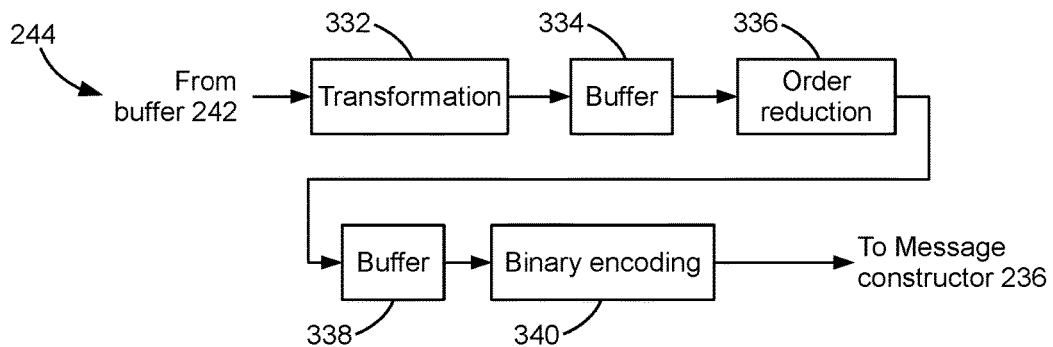
FIG. 9 shows the detail of the encoding module of the network interface shown in FIG. 7.
Figure 10:
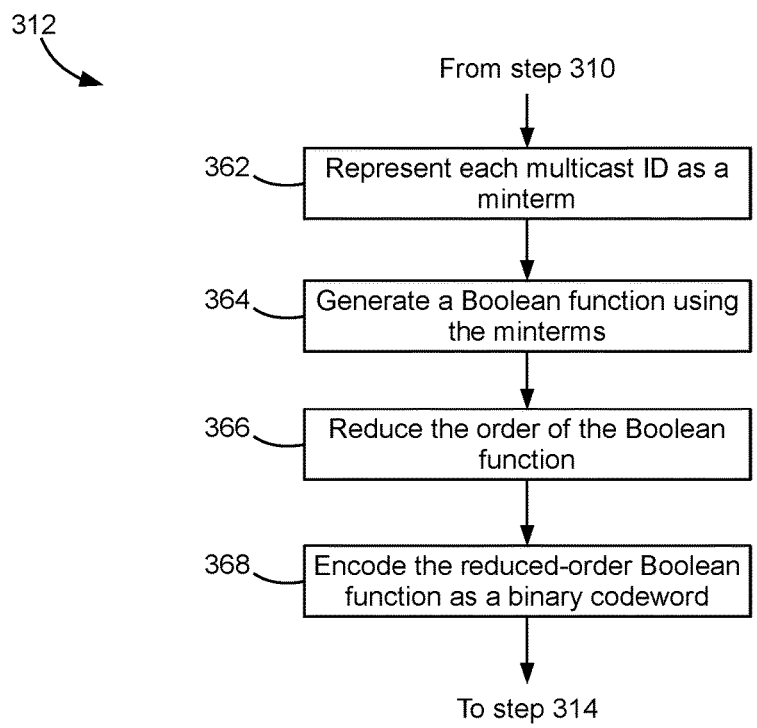
FIG. 10 shows the detail of a step of encoding multicast IDs of the process shown in FIG. 8.

FIGS. 9 and 10 show the details of the encoding module 244 and step 312 in these embodiments, respectively. As shown in FIG. 9, the encoding module 244 comprises a transformation module 332, a first intermediate buffer 334, an order-reduction module 336, a second intermediate buffer 338, and a binary-encoding module 340.

As shown in FIG. 10, at step 362, the transformation module 332 first represents each multicast ID as a minterm $g_i(x_{-1}, x_{k-2}, \ldots, x_0)$ in Boolean expression where i=1, 2, ..., L. At step 364, the transformation module 332 generates a Boolean function $f(x_{k-1}, x_{k-2}, \ldots, x_0)$ as the logic sum (binary OR) of the minterms:

$$f(x_{k-1}, x_{k-2}, \ldots, x_0) = g_1(x_{k-1}, x_{k-2}, \ldots, x_0) + \ldots + g_L(x_{k-1}, x_{k-2}, \ldots, x_0) \quad (2)$$

The generated Boolean function $f(x_{k-1}, x_{k-2}, \ldots, x_0)$ is stored in the first intermediate buffer 334.

At step 366, the order-reduction module 336 reads the Boolean function $f(x_{k-1}, x_{k-2}, \ldots, x_0)$ from the first intermediate buffer 334 and reduces the order thereof to obtain a reduced-order Boolean function $h(x_{k-1}, x_{k-2}, x_0)$. The reduced-order Boolean function $h(x_{k-1}, x_{k-2}, x_0)$ is stored in the second intermediate buffer 338.

At step 368, the binary-encoding module 340 reads the reduced-order Boolean function $h(x_{k-1}, x_{k-2}, \ldots, x_0)$ from the second intermediate buffer 338 and encodes the reduced-order Boolean function as a binary recipient codeword which is then sent to the message constructer 236 for being encapsulated into a condensed multicast message with data 246. As described before, the central-node device 102 then transmits the generated condensed multicast message in the wireless communication session 106 to the multicast group via the corresponding channel.

Due to the broadcast nature of the wireless medium, all end-node devices 104 may receive the transmitted condensed multicast message. Upon receiving the condensed multicast message, each end-node device 104 determines whether or not it is a recipient of the received message before processing the data in the message.

Figure 11:
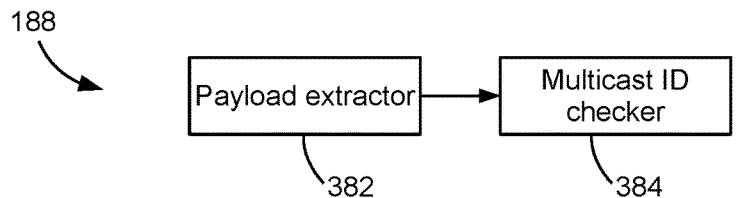
FIG. 11 shows a simplified functional structure of a network program of the end-node device shown in FIG. 3.
Figure 12:
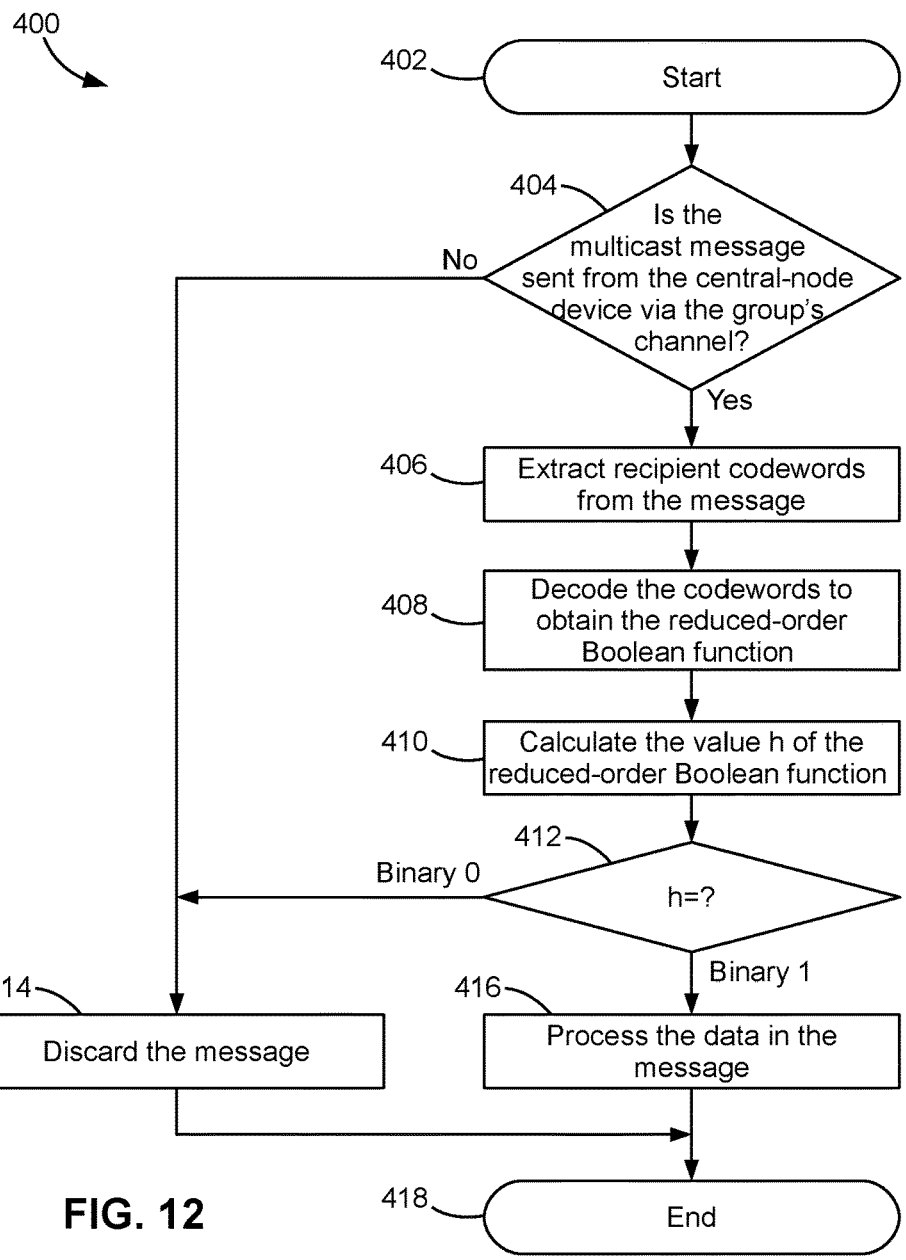
FIG. 12 is a flowchart showing a process executed by a listener device for determining whether or not the listener device is a recipient of a received multicast message.

FIG. 11 shows a simplified functional structure of the network program 188 of an end-node device 104. As shown, the network program 188 comprises a payload extractor 382 and a multicast ID checker 384 for determining whether or not the end-node device 104 is a recipient of the message. FIG. 12 is a flowchart showing a process 400 of determining whether or not the end-node device 104 is a recipient of the message.

With reference to FIGS. 11 and 12, the process 400 starts when the end-node device 104 receives a condensed multicast message (step 402). At step 404, the end-node device 104 determines whether the message is sent from the central-node device 102 via the channel corresponding to the multicast group that the end-node device 104 is associated therewith. If the message is not sent from the central-node device 102 or if the message is not sent via the corresponding channel, the end-node device 104 is not a recipient and the message is discarded (step 414). The process 400 then ends (step 418).

If the message is sent from the central-node device 102 via the corresponding channel, the payload extractor 382 of the end-node device 104 extracts the payload 248 from the message and extracts the one or more recipient codewords from the payload 248 (step 406). At step 408, the multicast ID checker 384 of the end-node device 104 decodes the one or more recipient codewords to obtain the reduced-order Boolean function $h(x_{k-1}, x_{k-2}, \ldots, x_0)$. At step 410, the multicast ID checker 384 calculates the value of the reduced-order Boolean function $h(x_{k-1}, x_{k-2}, \ldots, x_0)$ by using its multicast ID.

In particular, if the multicast ID of the end-node device 104 as a listener is $g_m(x_{k-1}, x_{k-2}, x_0) = b_{k-1} b_{k-2} \ldots b_0$, where $b_j$ ($j=0, \ldots, k-1$) is binary zero (0) or binary one (1), the multicast ID checker 384 calculates the value:

$$h = h(x_{k-1}, x_{k-2}, \ldots, x_0)|x_{k-1} = b_{k-1}, x_{k-2} = b_{k-2}, \ldots, x_0 = b_0. \quad (3)$$

If h=0 (the "Binary 0" branch of step 412), the end-node device 104 is not a recipient of the condensed multicast message and the end-node device 104 discards the message (step 414). If h=1 (the "Binary 1" branch of step 412), then the end-node device 104 is a recipient of the condensed multicast message and the end-node device 104 process the data in the payload 248 of the message (step 416). The process 400 then ends (step 418).

Figure 13:
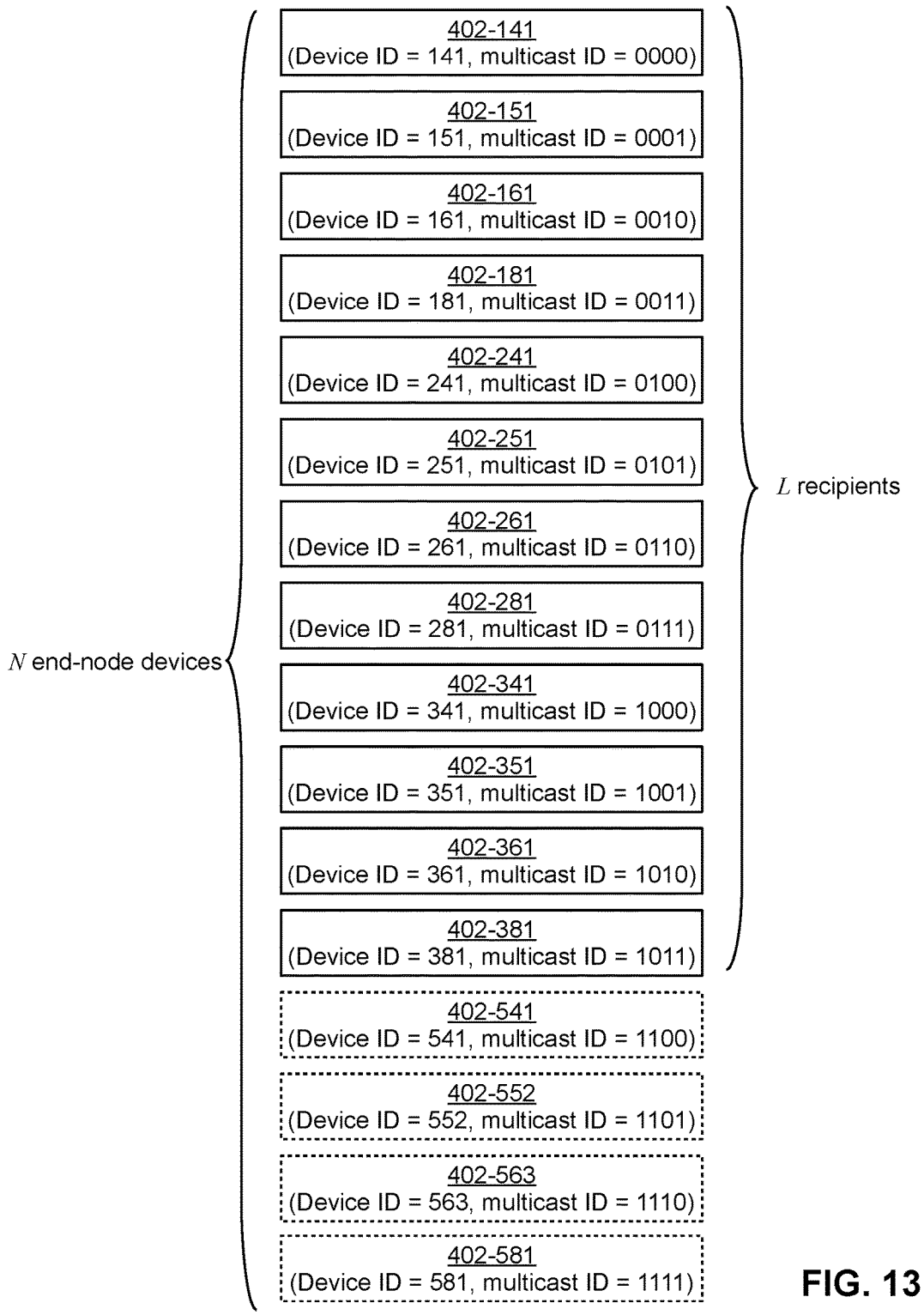

FIGS. 13 to 14D show an example of generating and transmitting a condensed multicast message. As shown in FIG. 13, the system 100 comprises 16 end-node devices 104 in a multicast group, including end-node devices 402-141, 402-151, 402-161, 402-181, 402-241, 402-251, 402-261, 402-281, 402-341, 402-351, 402-361, 402-381, 402-541, 402-552, 402-563, and 402-581. Each of these end-node devices comprises a unique device ID which in this example is the last 3 digits of its name. For example, the end-node device 402-141 has a device ID 141. Moreover, the 16 end-node devices are put into a same multicast group and each is assigned with a unique multicast ID of 4 bits. For example, devices 402-141, 402-151, 402-161, 402-181, 402-241, 402-251, 402-261, 402-281, 402-341, 402-351, 402-361, 402-381, 402-541, 402-552, 402-563, and 402-581 are assigned with multicast IDs 0000, 0001, 0010, 0011, 0100, 0101, 0110, 0111, 1000, 1001, 1010, 1011, 1100, 1101, 1110, and 1111, respectively.

A central-node device (not shown) may send a condensed multicast message to 12 recipient devices 402-141, 402-151, 402-161, 402-181, 402-241, 402-251, 402-261, 402-281, 402-341, 402-351, 402-361, and 402-381 (shown with solid-line boxes) among the 16 end-node devices of the multicast group. In these embodiments, wireless communication is used and the message is transmitted through the space which has the nature of broadcasting. As a result, all 16 end-node devices are listeners and may receive the transmitted message.

The central-node device encodes the multicast IDs of the 12 recipient devices into the condensed multicast message.

As described above, the multicast initiator 232 of the central-node device prepares a list of device IDs of the recipient devices, as shown in FIG. 14A where each device ID is represented using the decimal notation.

Then, the mapping module 240 of the central-node device maps each device ID in the recipient list to the corresponding multicast ID, as shown in the table in FIG. 14B, where each multicast ID is shown in a column of the table with the most significant bit (MSB) of the multicast ID in the top row.

The transformation module 332 of the central-node device represents each multicast ID as a minterm by representing each bit using a binary variable and adding a logic NOT operator thereto if the value of the bit is zero (0). In these embodiments, the minterm for each multicast ID is obtained from the MSB to the least significant bit (LSB) thereof. For example, the minterm for the multicast ID 1011 is $x_3 \overline{x_2} x_1 x_0$, where $\overline{x}$ represents the NOT operator to the binary variable x.

As shown in FIG. 14C, the transformation module 332 of the central-node device then generates a Boolean function of the recipient multicast IDs (denoted as a "recipient Boolean function" hereinafter) using the minterms:

$$f(x_3, x_2, x_1 x_0) = \overline{x_3}\,\overline{x_2}\,\overline{x_1}\,\overline{x_0} + \overline{x_3}\,\overline{x_2}\,\overline{x_1}\,x_0 + \overline{x_3}\,\overline{x_2}\,x_1\overline{x_0} + \quad (4)$$
$$\overline{x_3}\,\overline{x_2}\,x_1 x_0 + \overline{x_3}\,x_2\overline{x_1}\,\overline{x_0} + \overline{x_3}\,x_2\overline{x_1}\,x_0 + \overline{x_3}\,x_2 x_1 \overline{x_0} +$$
$$\overline{x_3}\,x_2 x_1 x_0 + x_3\overline{x_2}\,\overline{x_1}\,\overline{x_0} + x_3\overline{x_2}\,\overline{x_1}\,x_0 + x_3\overline{x_2}\,x_1\overline{x_0} + x_3\overline{x_2}\,x_1 x_0.$$

Thus, the function $f(x_3, x_2, x_1, x_0)$ is the logic sum (binary OR) of the minterms.

The order-reduction module 336 of the central-node device simplifies or minimizes the function $f(x_3, x_2, x_1, x_0)$ to obtain a simplified or minimized Boolean function (see FIG. 14D):

$$h(x_3, x_2, x_1, x_0) = \overline{x_3} + x_3\overline{x_2}. \quad (5)$$

The binary-encoding module 340 of the central-node device then uses a suitable encoding algorithm to encode the reduced-order Boolean function $h(x_3, x_2, x_1, x_0)$ in Equation (5) into a binary codeword as shown in FIG. 14E which is then encapsulated with the multicast data 246 into the payload 248 of a multicast message. The central-node device then transmits the generated condensed multicast message in the wireless communication session 106 to the multicast group via the corresponding channel.

The 16 listeners 402-141, 402-151, 402-161, 402-181, 402-241, 402-251, 402-261, 402-281, 402-341, 402-351, 402-361, 402-381, 402-541, 402-552, 402-563, and 402-581 receive the transmitted condensed multicast message. After confirming that the message is sent from the central-node device via the corresponding channel, each listener obtains the reduced-order Boolean function $h(x_3, x_2, x_1, x_0)$ from the message as described above and calculates the value thereof by using the multicast ID of the listener. For example, the listener 402-141 calculates the value of the reduced-order Boolean function using its multicast ID 0000 (i.e., $x_3=x_2=x_1=x_0=0$) as:

$$h(x_3, x_2, x_1, x_0) = \overline{x_3} + x_3\overline{x_2} = 1. \quad (6)$$

Therefore, the listener 402-141 is a recipient of the message and the listener 402-141 processes the data in the payload 248 of the message.

On the other hand, the listener 402-552 calculates the value of the reduced-order Boolean function using its multicast ID 1101 (i.e., $x_3=x_2=x_0=1$ and $x_1=0$) as:

$$h(x_3, x_2, x_1, x_0) = \overline{x_3} x_3 \overline{x_2} = 0. \quad (7)$$

Therefore, the listener 402-552 is not a recipient of the message and the listener 402-552 discards the message.

In some embodiments, the recipient Boolean function $f(x_{k-1}, x_{k-2}, \ldots, x_0)$ is stored in a binary decision diagram (BDD) data structure in buffer 334. The order-reduction module 336 uses a BDD reduction method to reduce the order of the function $f(x_{k-1}, x_{k-2}, \ldots, x_0)$ and obtain a reduced ordered binary decision diagram (ROBDD) for encoding the multicast IDs of recipients. As those skilled in the art will appreciate, the ROBDD is equivalent to the reduced-order Boolean function $h(x_{k-1}, x_{k-2}, \ldots, x_0)$.

In various embodiments, any suitable BDD reduction method may be used for obtaining the ROBDD thereof. For example, in one embodiment, the order-reduction module 336 may use the BDD reduction methods described in the academic paper entitled "Graph-Based Algorithms for Boolean Function Manipulation" to Randal E. Bryant, published in IEEE Transactions on Computers, C-35-8, pp.677-691, August, 1986, and the academic paper entitled "Efficient Implementation of a BDD Package" published in 27th ACM/IEEE Design Automation Conference, 1990, the content of each of which is incorporated herein by reference in its entirety.

Figure 15:
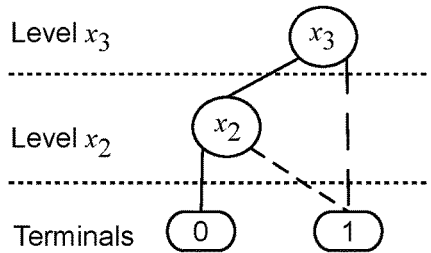
FIG. 15 shows a reduced ordered binary decision diagram (ROBDD) of the reduced-order Boolean function shown in FIG. 14D, according to some embodiments of this disclosure.

FIG. 15 shows the ROBDD of the reduced-order Boolean function $h(x_3, x_2, x_1, x_0)$ in the example shown in FIGS. 12A to 12E. As shown, the reduced-order Boolean function $h(x_3, x_2, x_1, x_0)$ is represented as a binary-tree graph or data structure having a level of terminals 0 and 1, and one or more levels of variables or vertices thereabove with each level having one or more vertices. In practice, a level may have zero, one, or more than one vertex. The vertices on the same level always have the same label which is the level's name.

For example, the ROBDD shown in FIG. 15 only contains two levels (level $x_3$ and level $x_2$) having non-zero number of vertices. More specifically, level $x_3$ and level $x_2$ each has one vertex $x_3$ and $x_2$, respectively. Levels $x_1$ and $x_0$ have zero vertex and are not shown in the ROBDD.

The ROBDD is then encoded into a codeword and is encapsulated into a multicast message for transmission.

Those skilled in the art will appreciate that various methods may be used to encode the ROBDD of the reduced-order Boolean function $h(x_{k-1}, x_{k-2}, \ldots, x_0)$. In one embodiment, the binary encoding module 340 uses a naive method to encode the ROBDD of the reduced-order Boolean function which outputs the size (i.e., the number of vertices) of each layer followed by a list of children of each vertex. The decoding complexity of the naive encoding method is 0(l), where l denotes the number of non-empty levels in the ROBDD.

FIGS. 16A to 16D show a flowchart of a process 500 executed by the binary encoding module 340 of a sender for encoding the ROBDD of the reduced-order Boolean function $h(x_{k-1}, x_{k-2}, \ldots, x_0)$ into binary a codeword using the naive method.

Figure 16A:
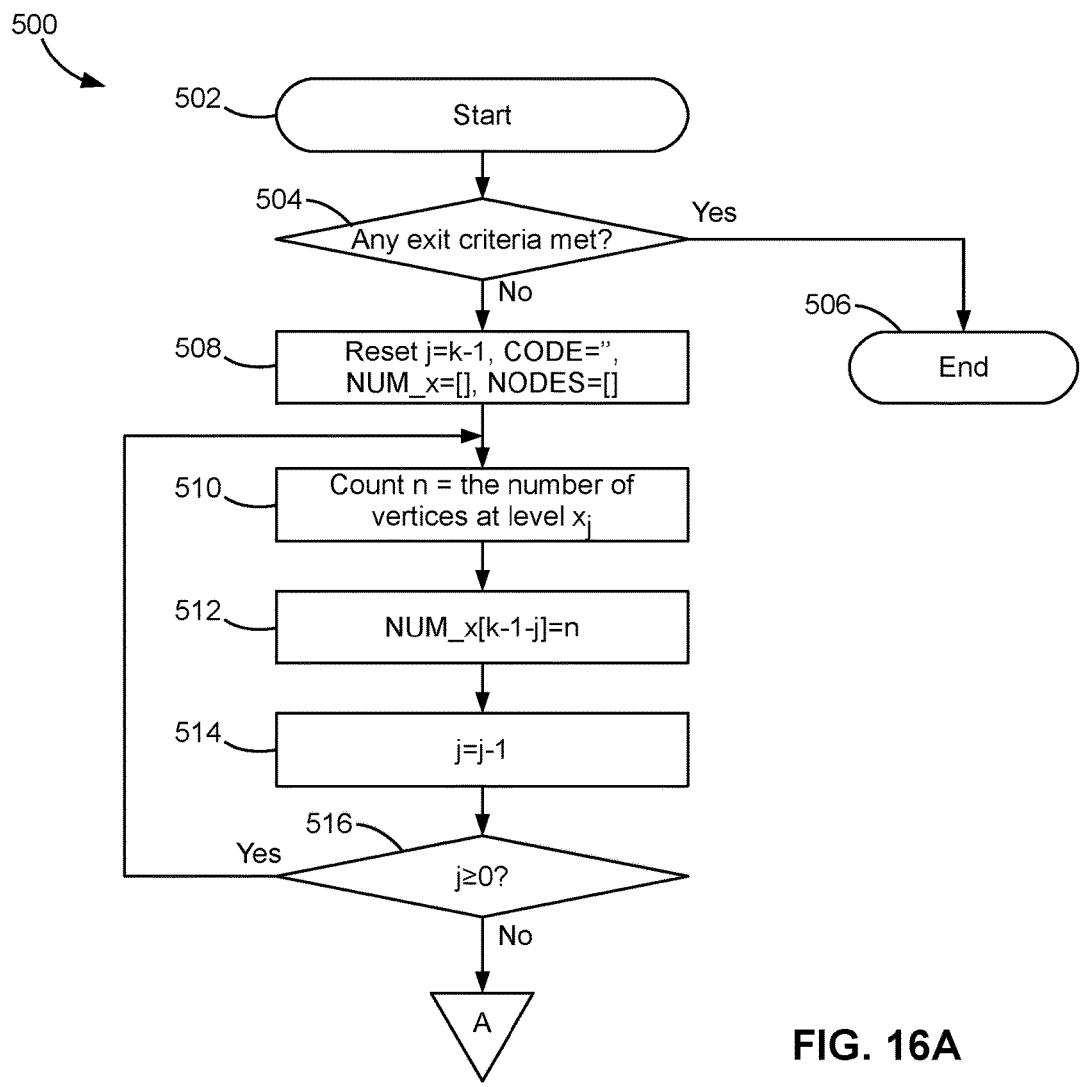
FIGS. 16A to 16D show a flowchart of a process executed by a binary encoding module 340 of a sender shown in FIG. 9 for encoding the ROBDD of the reduced-order Boolean function into a compact binary codeword using a naive method, according to some embodiments of this disclosure.

As shown in FIG. 16A, after the process 500 starts (step 502), the binary encoding module 340 checks if any exit criteria have been satisfied (step 504). If one or more of the exit criteria are satisfied, the process 500 terminates (step 506). Otherwise, the process 500 goes to step 508 and the binary encoding module 340 resets a loop variable j to k-1, where k is the number of bits used to represent a Multicast ID, resets a string variable CODE to an empty string, resets an integer array NUM_x to an empty array, and rests a tuple array NODES to an empty array. As will be described in more detail later, array NUM_x stores the number of vertices of each level, and array NODES stores the children of each vertex.

At step 510, the number of vertices at level $x_j$ is counted and stored in a temporary variable n. The level of terminals is not counted. At step 512, n is stored into the (k-1-j)-th elements of the array NUM_x:

$$\text{NUM\_}x[k-1-j]=n. \quad (8)$$

At step 512, the loop variable j is decreased by 1. At step 514, the binary encoding module 340 checks if the loop variable j is greater than or equal to 0. If j≥0, the process 500 loops back to step 510. If j<0, the process 500 goes to step 518 shown in FIG. 16B.

After the loop of steps 510 to 514, the array NUM_x stores the level information of the ROBDD, i.e., the number of vertices at each level of the ROBDD with NUM_x[0] storing the number of vertices at the top level of vertices and NUM_x[k-1] storing the number of vertices at the bottom level of vertices. As described before, the level of terminals at the bottom of the graph is not counted.

Figure 16B:
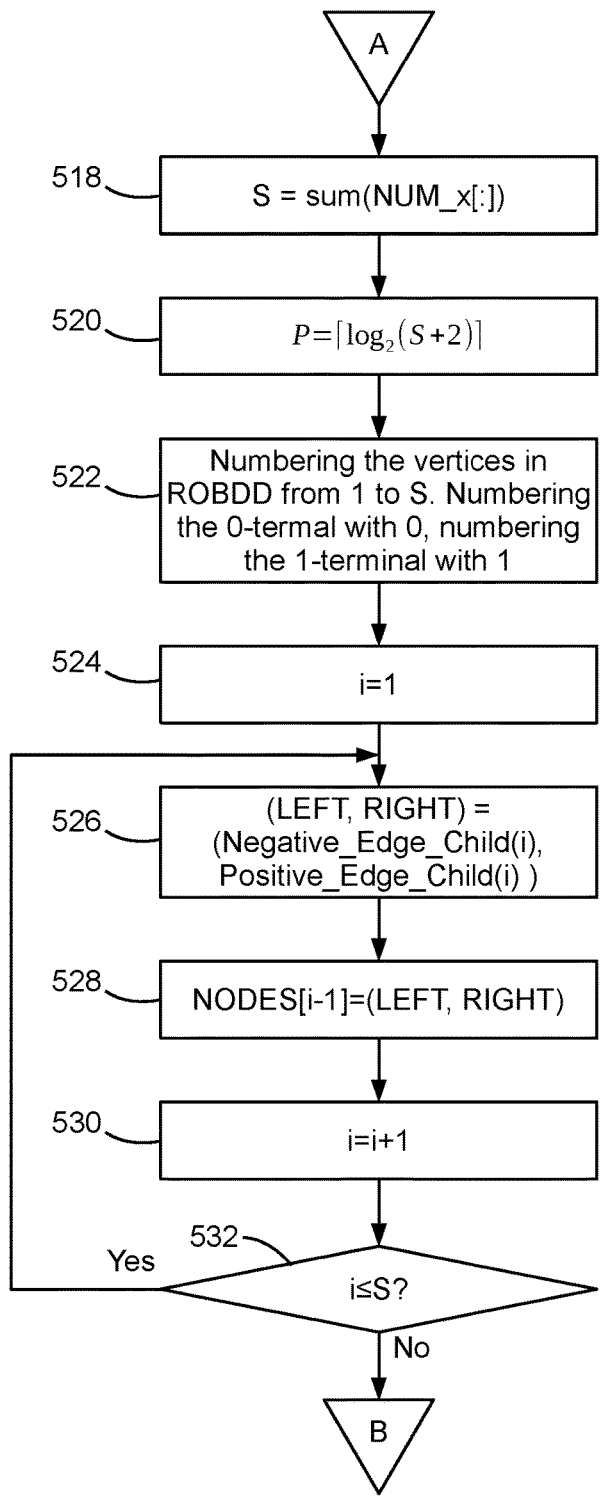

Referring to FIG. 16B, at step 518, the total number of vertices S is calculated by calculating the summation of all elements in array NUM_x:

$$S=\text{sum}(\text{NUM\_}x[:]). \quad (9)$$

where NUM_x[:] represents all elements of array NUM_x, and sum( ) is a summation function.

Then at step 520, the number of bits P for encoding a vertex is calculated as $$P=\lceil \log_2(S+2) \rceil. \quad (10)$$

At step 522, the vertices in the ROBDD graph are numbered with integer from 1 to S. The vertices are numbered from the top level $x_{k-1}$ to the bottom level $x_0$, and in each level, the vertices are numbered from left to right. Moreover, the two terminals, i.e., the 0-terminal and the 1-terminal, are numbered with integer 0 and 1, respectively.

At step 524, a loop counter i is set to 1. At step 526, the child of vertex i which is connected through the negative edge (Negative_Edge_Child(i), for example, the child of vertex i connected by a dashed line shown in FIG. 15) is put in a variable LEFT, and the child of vertex i which is connected through the positive edge (Positive_Edge_Child (i), for example, the child of vertex i connected by a solid line shown in FIG. 15) is put in a variable RIGHT:

$$(\text{LEFT, RIGHT})=(\text{Negative\_Edge\_Child}(i), \text{Positive\_Edge\_Child}(i)). \quad (11)$$

At step 528, the tuple (LEFT, RIGHT) is stored in the (i-1)-th element of array NODES:

$$\text{NODES}[i-1]=(\text{LEFT, RIGHT}). \quad (12)$$

The loop counter i is then increased by 1 (step 530) and the binary encoding module 340 checks if the loop counter i is smaller than or equal to S (step 532). If i≤S, the process 500 loops back to step 526. If i >S, the process 500 goes to step 534 shown in FIG. 16C.

After the loop of steps 526 to 530, the array NODES stores the structure of the ROBDD, i.e., the connections of the vertices of the ROBDD.

Figure 16C:
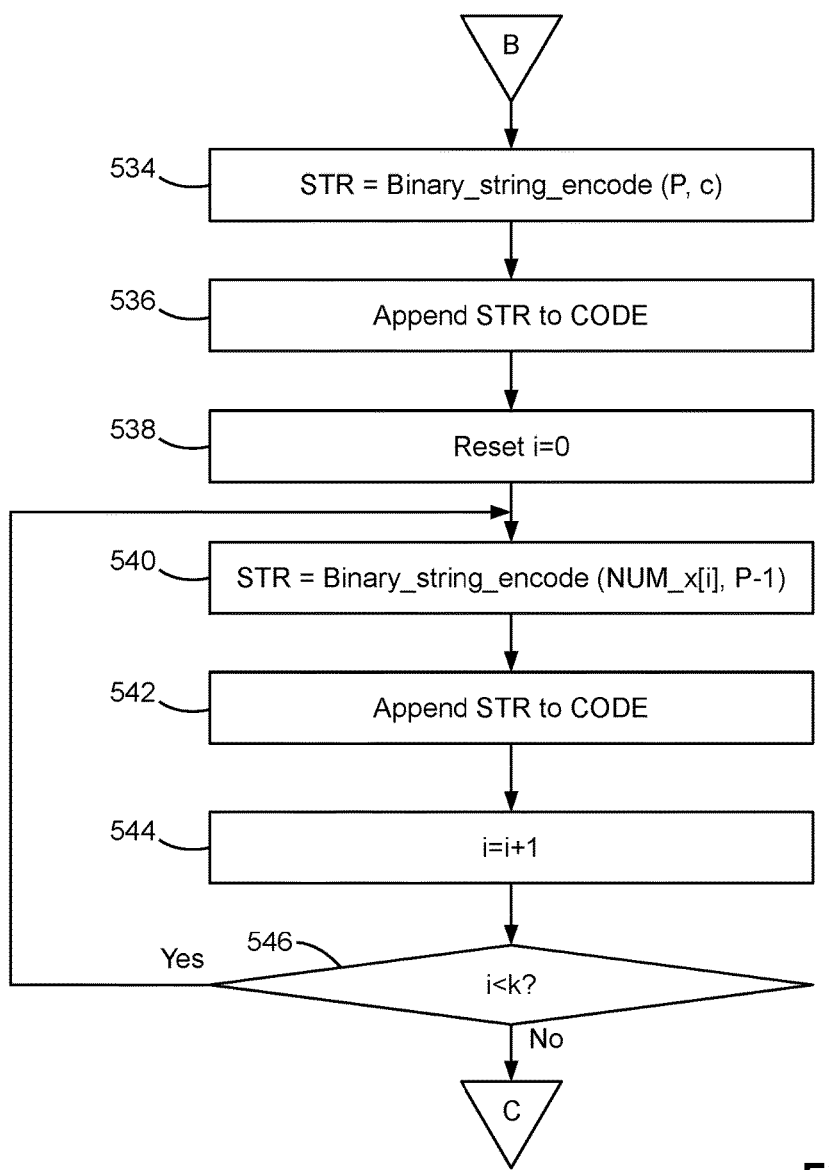

Referring to FIG. 16C, at step 534, a function Binary_string_encode is used to convert the first input integer variable P into a binary string STR of c characters where $c=\lceil \log_2 k \rceil$:

$$STR=Binary\_string\_encode\ (P, c). \quad (13)$$

Herein, a binary string refers to a string only comprises characters '0' and '1').

In particular, the function Binary_string_encode first converts P into a binary number, and truncates the obtained binary number by reserving the last c bits. Then, the function Binary_string_encode converts the obtained c-bit binary number into a binary string of c characters. For example, if c=4 and P=7, the function Binary_string_encode first converts P into a binary number 00000111, and truncates the obtained binary number by reserving the last 4 bits, i.e., by reserving 0111. Then, the function Binary_string_encode converts the obtained binary number 0111 into a binary string STR of 4 characters, i.e., "0111". The string STR is appended to the right side of the variable CODE (step 536):

$$CODE=CODE\|STR, \quad (14)$$

where "‖" represents the concatenating operation.

Then, the loop counter i is reset to 0 (step 538) and the i-th element of NUM_x is covered to a (P-1)-bit binary string STR (step 540):

$$STR=Binary\_string\_encode\ (NUM\_x[i], P-1). \quad (15)$$

The binary string STR is appended to the right side of the variable CODE (step 542):

$$CODE=CODE\|STR. \quad (16)$$

Figure 16D:
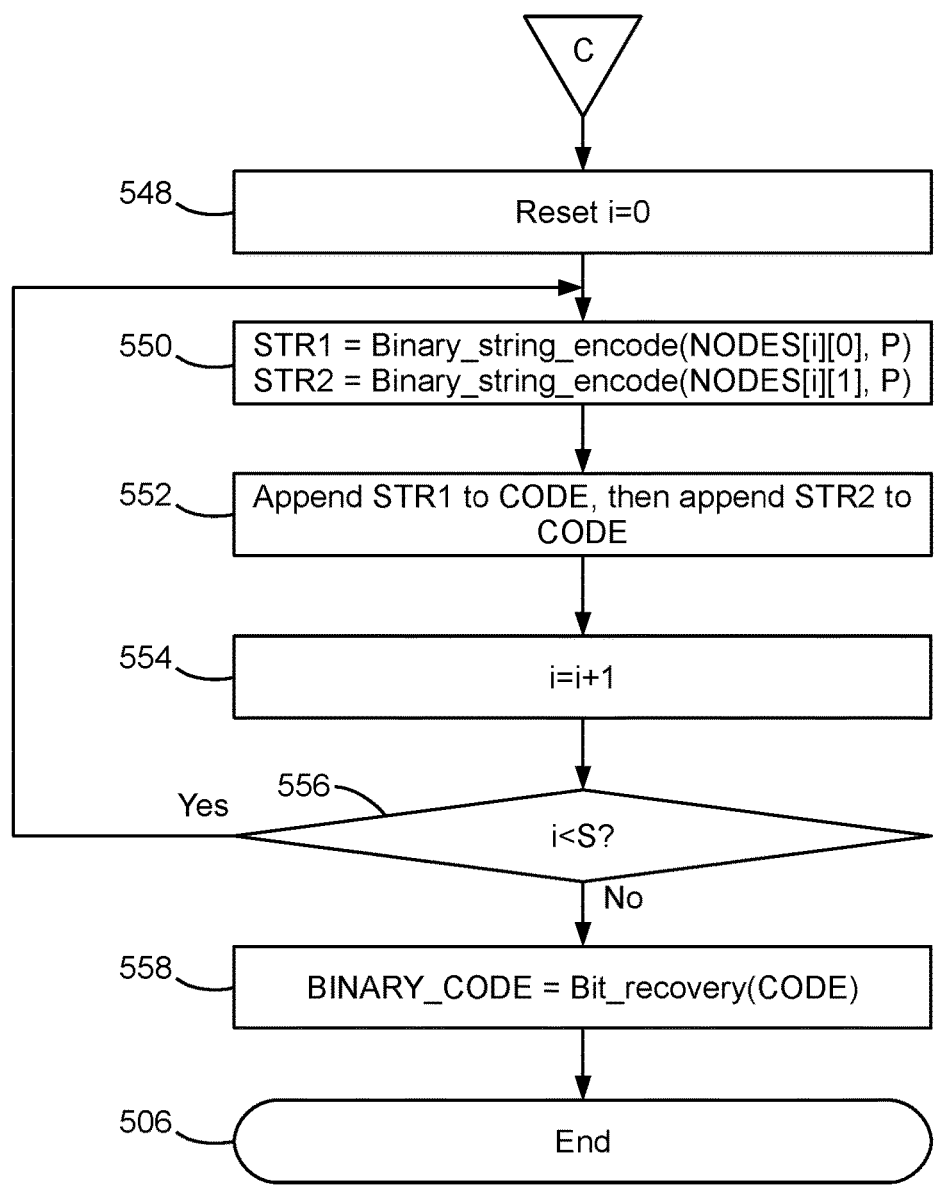

Then, the loop counter i is increased by 1 (step 544) and the binary encoding module 340 checks if the loop counter i is smaller than k (step 546). If the loop counter i is smaller than k, the process 500 loops back to step 540. If the loop counter i is not smaller than k, the process goes to step 548 as shown in FIG. 16D.

At step 548, the loop counter i is reset to 0. Then, the i-th element of the array NODES is extracted (step 550). In particular, the two variables inside the i-th element of the array NODES are converted to binary strings STR1 and STR2, respectively:

$$STR1=Binary\_string\_encode(NODES[i][0], P), \quad (17)$$

$$STR2=Binary\_string\_encode(NODES[i][1], P). \quad (18)$$

STR1 and STR2 are appended to CODE, respectively (step 552):

$$CODE=CODE\|STR1, \quad (19)$$

$$CODE=CODE\|STR2. \quad (20)$$

Then, the loop counter i is increased by 1 (step 554), and the binary encoding module 340 checks if the loop counter i is smaller than S (step 556). If the loop counter i is smaller than S, the process 500 loops back to step 550. If the loop counter i is not smaller than S, the binary string variable CODE is converted back to a binary number and stores in a variable BINARY_CODE as the output of the binary encoding module 340:

$$BINARY\_CODE=Bit\ recovery(CODE). \quad (21)$$

For example, if CODE is a binary string of "0111", then, $$BINARY\_CODE=Bit\ recovery(CODE)=Bit\_recovery\ ("0111")=0111. \quad (22)$$

The process 500 is then terminated (step 506 which is the same step 506 shown in FIG. 16A).

The codeword BINARY_CODE stores the following information in sequence as shown in Table 1.

TABLE 1

| Variable | Length | Notes |
| --- | --- | --- |
| P | $c = \lceil \log_2 k \rceil$ bits | Number of bits for encoding a vertex |
| NUM_x[0] ... NUM_x[k−1] | P−1 bits for each NUM_x[i], where i = 0, ..., k−1. | Level information of the ROBDD: Number of vertices at each level thereof |
| NODES[0][0] NODES[0][1] ... NODES[S−1][0] NODES[S−1][1] | P bits for each NODES[m][n], where m = 0, ..., S−1, and n = 0, 1. | Structure information of the ROBDD, i.e., connections of the vertices. NODES[m][0] and NODES[m][1] store the information of the m-th level of the ROBDD, wherein NODES[m][0] stores the child vertex or the terminal (0 or 1) linked from the m-th level through the negative connection, and NODES[m][1] stores the child vertex or the terminal (0 or 1) linked from the m-th level through the positive connection. |

After the process 500 is completed, the codeword BINARY_CODE is encapsulated into the payload of a multicast message with the multicast data.

In the example shown in FIGS. 13 to 15, the total number of end-node devices is N=16, and k is selected as $k=\lceil \log_2 N \rceil=4$, and thus $c=\lceil \log_2 k \rceil=2$. The ROBDD is shown in FIG. 15 which contains two vertices. Therefore, S=2 and $P=\lceil \log_2 (S+2) \rceil=2$. The information stored in the codeword BINARY_CODE is shown in Table 2.

TABLE 2

| Variable | Binary Value |
| --- | --- |
| P | 10 |
| NUM_x[0] | 1 |
| NUM_x[1] | 1 |
| NUM_x[2] | 0 |
| NUM_x[3] | 0 |
| NODES[0][0] | 01 |

TABLE 2-continued

| Variable | Binary Value |
| --- | --- |
| NODES[0][1] | 10 |
| NODES[1][0] | 01 |
| NODES[1][1] | 00 |

Therefore, the codeword BINARY_CODE for encoding the ROBDD shown in FIG. 15 is 10110001100100. The codeword 10110001100100 is then encapsulated into a multicast message for transmission.

When a listener receives the multicast message, the codeword is extracted from the multicast message, and is decoded by (i) extracting the information of the ROBDD, and (ii) traversing the ROBDD from the top level which is numbered as the 0-th level and moving down to the bottom level following a path determined by the value of each bit of the listener's multicast ID. Those skilled in the art will appreciate that the traversing of the ROBDD stops whenever a decision of whether or not the listener is a recipient of the message can be readily made. Therefore, some bits of the listener's multicast ID may not be used when a decision is made.

Figure 17A:
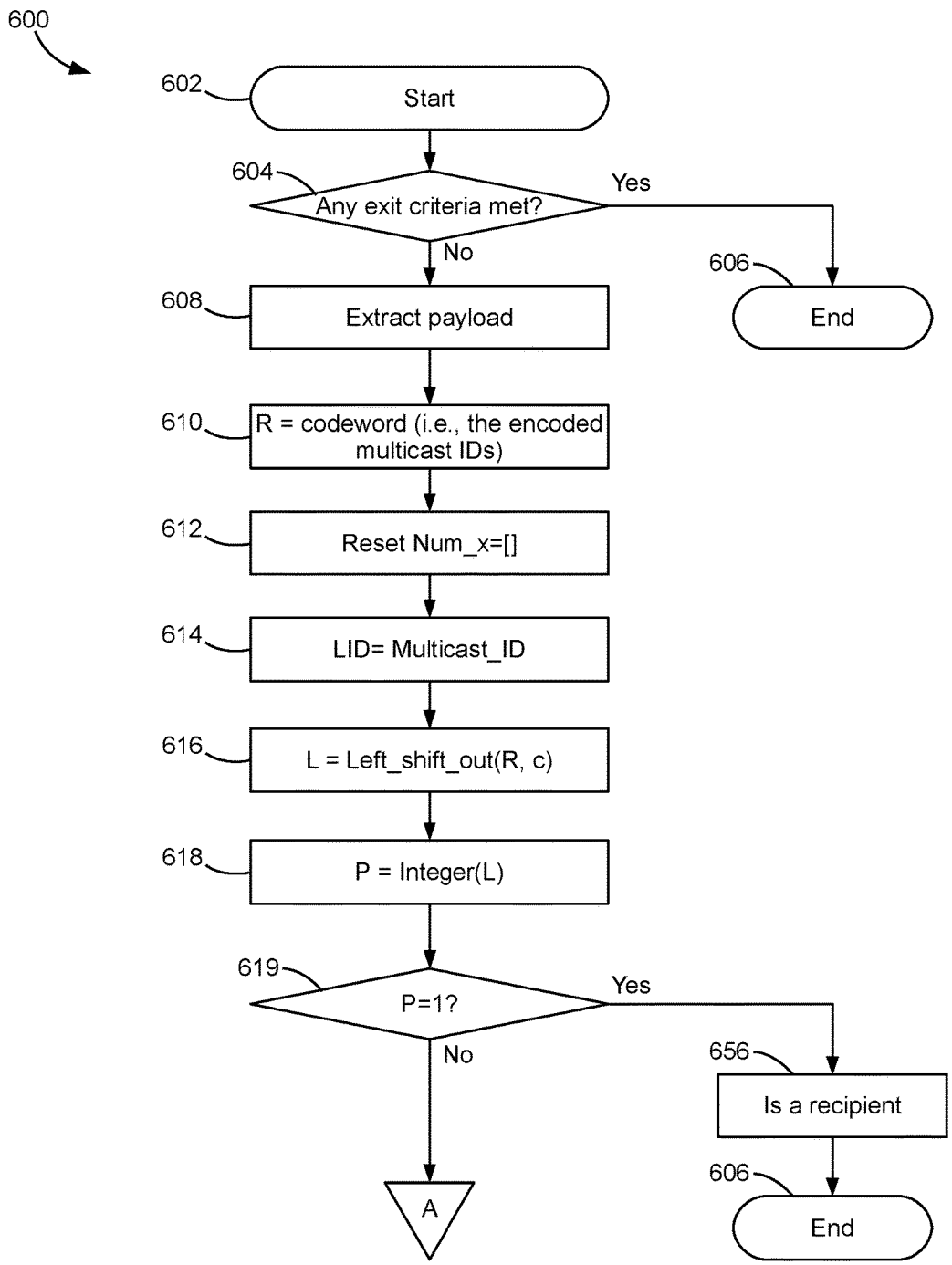
FIGS. 17A to 17C show a flowchart of a process executed by a listener device for determining whether or not the listener device is a recipient of a received condensed multicast message, according to some embodiments of this disclosure.
Figure 17B:
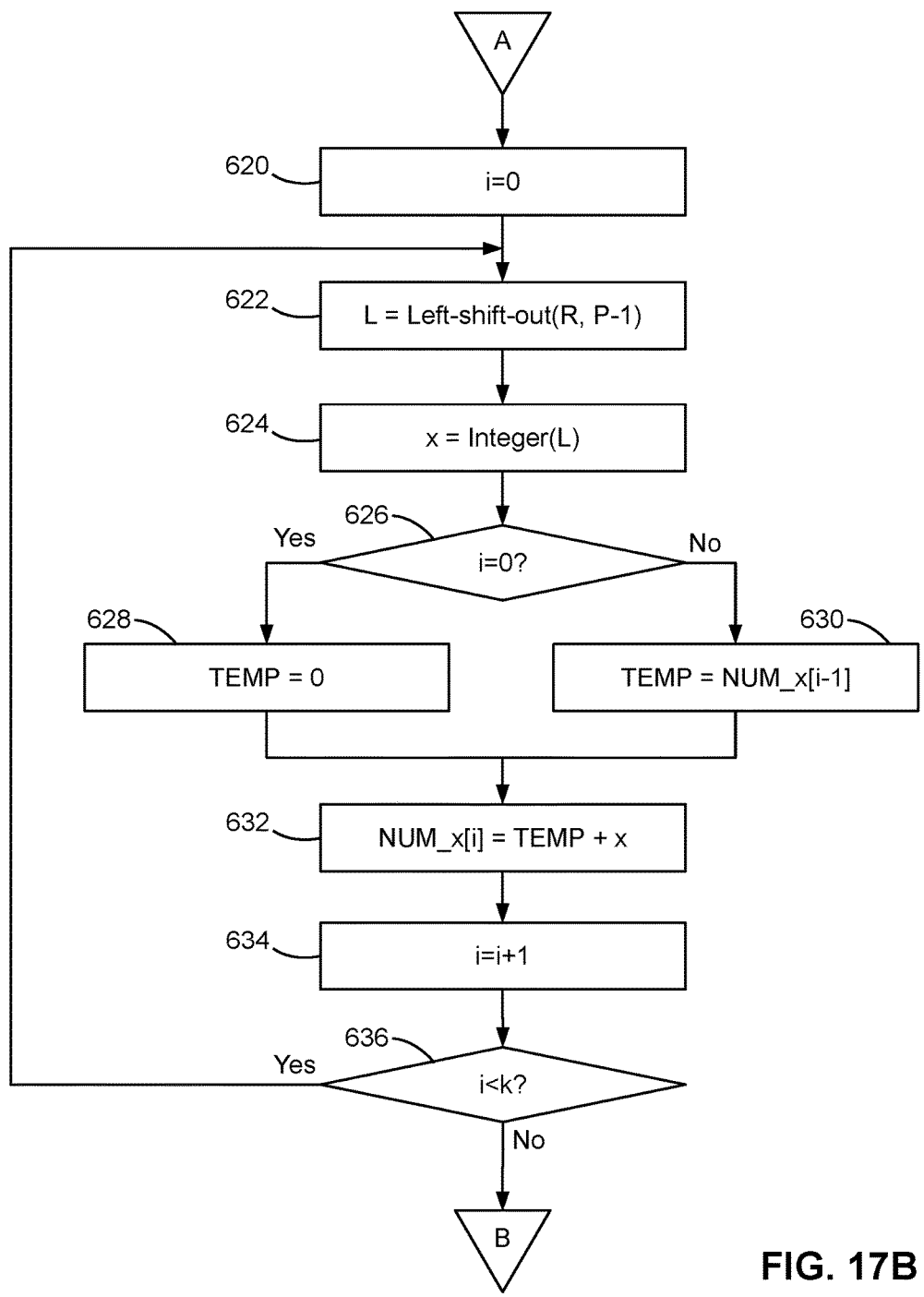
Figure 17C:
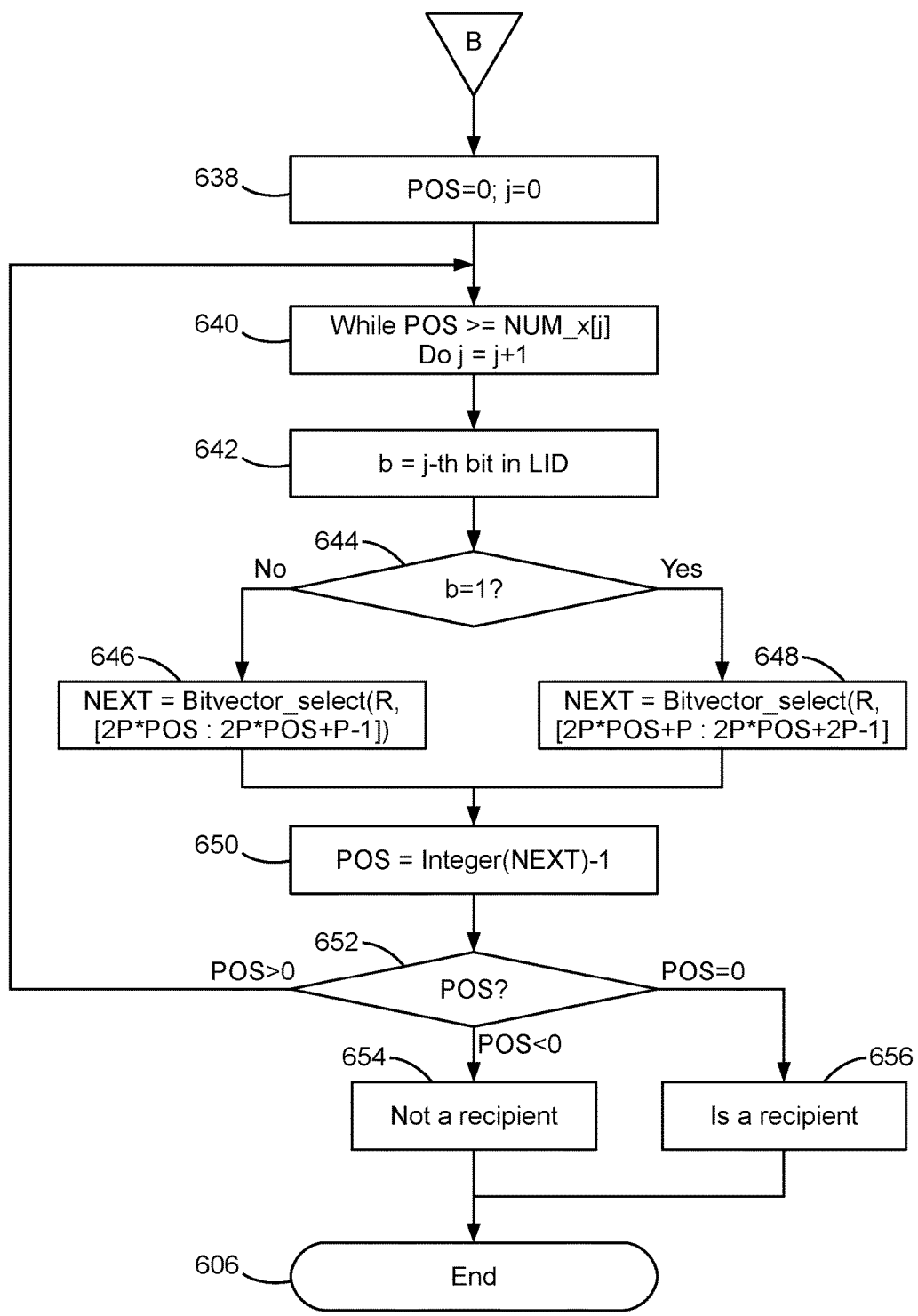

FIGS. 17A to 17C show a flowchart of a process 600 executed by a listener such as an end-node device 104 in some embodiments for determining whether or not the listener is a recipient of a condensed multicast message.

As shown in FIG. 17A, after the process 600 starts (step 602), the listener checks if any exit criteria have been satisfied (step 604). If one or more of the exit criteria are satisfied, the process 600 terminates (step 606). Otherwise, the process 600 goes to step 608 and the payload extractor 382 extracts the payload of the received condensed multicast message.

At step 610, the payload extractor 382 extracts the recipient codeword (i.e., the encoded multicast IDs) from the payload and put the recipient codeword, which is the recipient codeword BINARY_CODE generated by the sender, into a variable R for the multicast ID checker 384 of the listener to process.

The multicast ID checker 384 resets an array NUM_x to empty (step 612) and puts the listener's multicast ID into a variable LID (step 614).

At step 616, a function Left shift out is used to left-shift the variable R by c bits where $c=\lceil \log_2 k \rceil$, and the c bits shifted out of R are put into a variable L:

$$L=\text{Left\_shift\_out}(R, c). \quad (23)$$

and R is appended with c bits of zeros to maintain the same length. For example, if R=10110001100100, and c=2, then, $$L=\text{Left\_shift\_out}(R, c)=\text{Left\_shift\_out}(10110001100100, 2)=(10)_2, \quad (24)$$

$$R=11000110010000, \quad (25)$$

where the subscript 2 in expression $(x)_2$ indicates that x is a binary number. Such expression $(x)_2$ is used herein only for clarification, and some binary numbers are not written in such an expression if they are clearly binary numbers from the context.

At step 618, the variable L is converted to an integer P. Thus, the variable P calculated at the sender (see Equation (10)) is retrieved. At step 619, the value of P is checked. If P=1, then the multicast ID of the listener is in the recipient list (step 656), and the process 600 terminates (step 606). If P≠1, the process 600 goes to step 620 shown in FIG. 17B.

Referring to FIG. 17B, a loop counter i is set to 0 (step 620). Then, the variable R is left-shifted by P-1 bits, and the shifted-out bits are put into the variable L (step 622):

$$L=\text{Left\_shift\_out}(R, P-1), \quad (26)$$

and the variable L is converted to an integer x (step 624).

At step 626, the multicast ID checker 384 checks if the loop counter i is equal to 0. If i=0, the multicast ID checker 384 sets a variable TEMP to zero (step 628). If i≠0, the multicast ID checker 384 sets the variable TEMP as the (i-1)-th element of array NUM_x (step 630):

$$\text{TEMP}=\text{NUM}\_x[i-1].$$

At step 632, the i-th element of array NUM_x is updated with the summation of TEMP and x:

$$\text{NUM}\_x[i-1]=\text{TEMP}+x.$$

Then, the loop counter i is increased by 1 (step 634), and the multicast ID checker 384 checks if the loop counter i is smaller than k (step 636). If the loop counter i is smaller than k, the process 600 loops back to step 622. If the loop counter i is not smaller than k, the process 600 goes to step 638 shown in FIG. 17C.

Steps 602 to 636 decode the recipient codeword and obtains the general structural information of the ROBDD which represents the list of recipients of the multicast message. In particular, the loop of steps 622 to 636 extracts the accumulated number of vertices at each level counted from the top level, and stores the accumulated numbers in array NUM_x which will be used for traversing the ROBDD. After array NUM_x is built, the variable R only comprises the array NODES generated by the sender (see Equation (12) and Table 1) and appended zeros. In other words, after the loop of steps 622 to 636 is finished, the listener has extracted the ROBDD from the recipient codeword and stores the ROBDD in variable R.

As will be described in more detail below, the process 600 then extracts one or more relevant codeword segments from variable R based on the bits of the multicast ID of the listener, and parses the extracted codeword segments one by one (steps 638 to 652, to be described below). If the value of the last segment minus one is equal to zero, then the multicast ID of the listener is in the recipient list (step 656); if the value of the last segment minus one is smaller than zero, the multicast ID of the listener is in the recipient list (step 654).

Referring to FIG. 17C, a variable POS and a variable j are set to 0 (step 638) to start the traversing of the ROBDD from the top level thereof. The variable POS indicates the level of the ROBDD to be processed, starting from the top level which is numbered as the 0-th level and moving down to the bottom level following a path determined by the value of each bit of the listener's multicast ID.

At step 640, the multicast ID checker 384 finds the smallest j that the j-th element of array NUM_x[j] is larger than POS by for example, using a while-do loop:

While POS≥NUM_x[j]
Do j=j+1.

Then, the j-th bit in LID (starting from the leftmost bit or the MSB thereof) is selected and assigned to a binary variable b (step 642). The multicast ID checker 384 checks if the binary variable b is equal to 1 (step 644). If the binary variable b is not equal to 1, the bits segment of R from (2P*POS) to (2P*POS+P-1) is selected and assigned to a variable NEXT (step 646):

$$\text{NEXT}=\text{Bitvector\_select}(R, [2P*\text{POS}:2P*\text{POS}+P-1]).$$

where * represents multiplication, and Bitvector_select(R, [$n_1$:$n_2$]) is a function selecting the bits segment of R from the ($n_1$)-th bit thereof to the ($n_2$)-th bit thereof, where $n_1 \geq 0$ and $n_2 \geq 0$.

If the binary variable b is equal to 1, the bits segment from (2*P*POS+P) to (2P*P0S+2P−1) is selected and assigned to the variable NEXT (step 648):

NEXT=Bitvector_select(R, [2P*POS+P:2P*P0S+ 2P−1]).

Those skilled in the art will appreciate that the process 600 at step 642 extracts a bit from the listener's multicast ID (starting from the leftmost bit thereof). Then, the process 600 follows the path of the ROBDD determined by the extracted bit to extract the corresponding vertex from R, i.e., the corresponding NODE[m][n] generated by the sender, and stores it in variable NEXT (steps 644 and 646, or steps 644 and 648 depending on the value of b).

The extracted vertex also indicates the next level to be processed. Therefore, at step 650, the variable POS is updated as the integer value of the variable NEXT minus one:

POS=Integer(NEXT)−1.

The updated variable POS whether a next bit of the listener's multicast ID is needed to further traverse the ROBDD, and if not, whether or not the listener is a recipient. In particular, the multicast ID checker 384 checks the value of variable POS (step 652). If POS is greater than zero, a next bit of the listener's multicast ID is needed to further traverse the ROBDD and the process 600 loops back to step 640. If POS is smaller than zero (i.e., POS=−1, and the integer value of variable NEXT is zero), the listener is not a recipient of the multicast message (step 654). If POS is equal to zero (i.e., the integer value of variable NEXT is one), the listener is a recipient of the multicast message (step 656).

The process 600 terminates (step 606) after step 654 or 656.

Using the example shown in FIGS. 13 to 15, a multicast message is generated by the central-node device and is transmitted to all end-node devices shown in FIG. 13. The multicast message encapsulates a codeword 10110001100100 as shown in FIG. 14E represents a ROBDD as shown in FIG. 15.

An end-node device 402-563 with a multicast ID of 1110 (see FIG. 13) receives the multicast message and starts the process 600 to check if it is a recipient. As the total number of end-node devices is known as N=16, The end-node device 402-563 has the knowledge of k=[$\log_2 N$]=4, and c= [$\log_2 k$]=2.

Following the steps shown in FIGS. 17A to 17C, the end-node device 402-563 extracts the codeword from the received multicast message and stores it in a variable R, i.e., R=10110001100100. At steps 616 and 618, the end-node device 402-563 determines that L=$(10)_2$, R=11000110010000, and P=2.

Through the loop of steps 622 to 636, the end-node device 402-563 builds array NUM _x as NUM_x[0]=1, NUM_x [1]=2, NUM_x[2]=2, and NUM x[3] =2, and R becomes 01100100 000000 after the loop of steps 622 to 636 is completed. Those skilled in the art will appreciate that At step 638, a variable POS is set to 0. At step 640, the end-node device 402-563 determines that j=0 is the smallest j satisfying POS<NUM_x[j]. At step 642, the j-th bit of the multicast ID 1110 of the end-node device 402-563, from the leftmost bit thereof, is extracted as b=1. The process 600 then branches through step 644 to step 648 and determines that NEXT=R(2:3)=$(10)_2$ or NEXT=2 in decimal format.

At step 650, POS is calculated as POS=Integer(NEXT)− 1=1. As POS>0, the process 600 branches through step 652 and loops back to step 640.

At step 640, the end-node device 402-563 determines that j=1 is the smallest j satisfying POS<NUM_x[j]. At step 642, the j-th bit of the multicast ID 1110 of the end-node device 402-563 is extracted as b=1. The process 600 then branches through step 644 to step 648 and determines that NEXT=R (6:7)=$(00)_2$ or NEXT=0 in decimal format.

At step 650, POS is calculated as POS=Integer(NEXT)− 1=−1. As POS<0, the end-node device 402-563 is not a recipient of the multicast message it receives.

In above embodiments, the central-node device 102 generates condensed multicast messages for sending to a plurality of recipient end-node devices 104. Each condensed multicast message comprises at least the data and encoded multicast IDs of the recipient end-node devices 104. By losslessly encoding the multicast IDs of the recipient end-node devices 104, the multicast IDs of the recipient end-node devices 104 are losslessly transformed into a codeword having a length shorter than that of the total length of the multicast IDs of the recipient end-node devices 104, thereby requiring less bandwidth for transmission.

FIGS. 18 to 20D show some simulation results of the system 100 and above-described method of generating and transmitting condensed multicast messages. In the simulation, the bit length reduction of above-described method of generating and transmitting condensed multicast messages is evaluated in three different scenarios, namely equal-spaced, random-sets, and pure-random. The bit length after encoding the process 500 shown in FIGS. 16A to 16D (referred as the "BDD length") is compared with the total bit length of the uncoded multicast IDs in the recipient list (referred as the "ref length"). In the simulation, each multicast ID has a length of 10 bits, and thus the system 100 is capable of having a maximum of $2^{10}$=1024 end-node devices 104.

Figure 18:
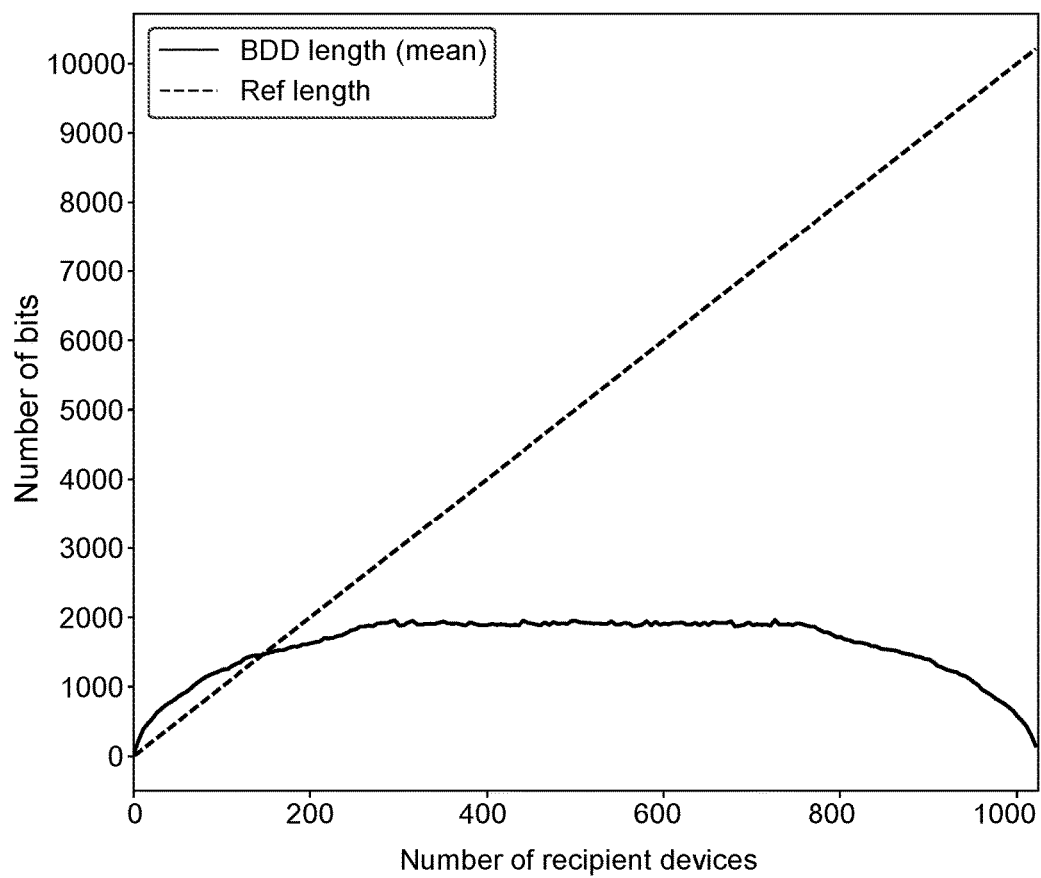
Figure 19A:
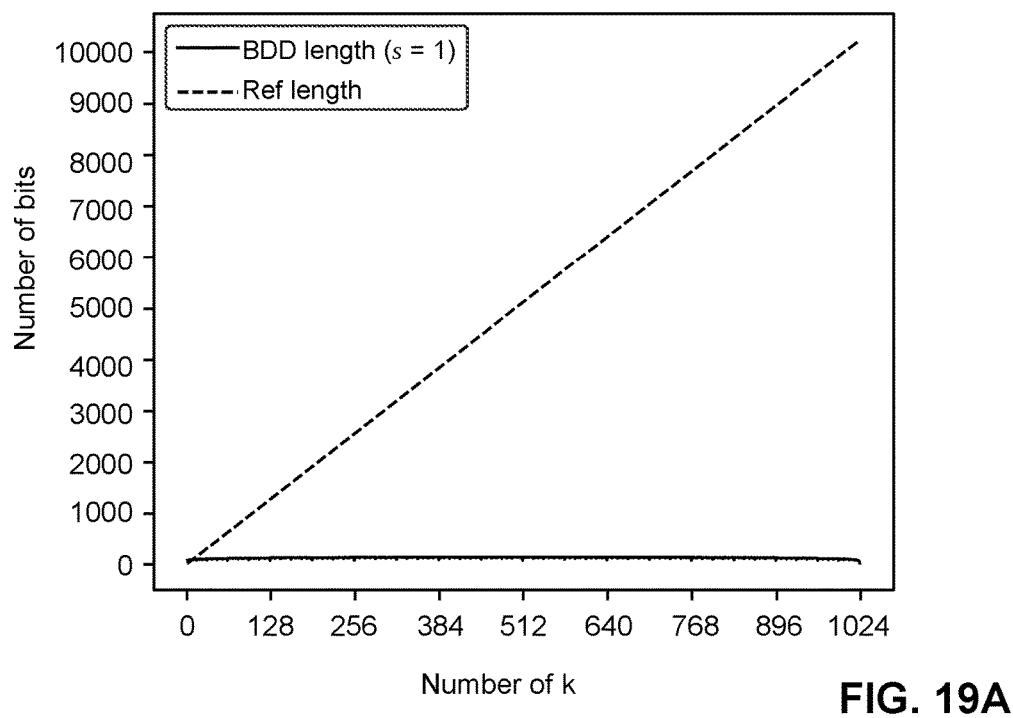
FIGS. 19A to 19D show the simulation results in an equal-spaced scenario.
Figure 19B:
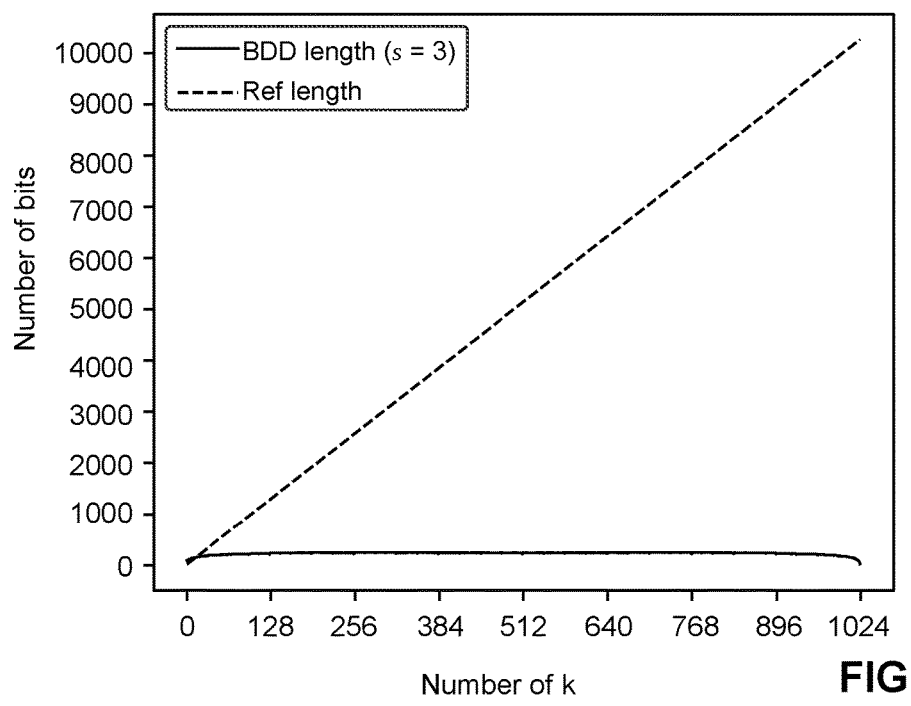
Figure 19C:
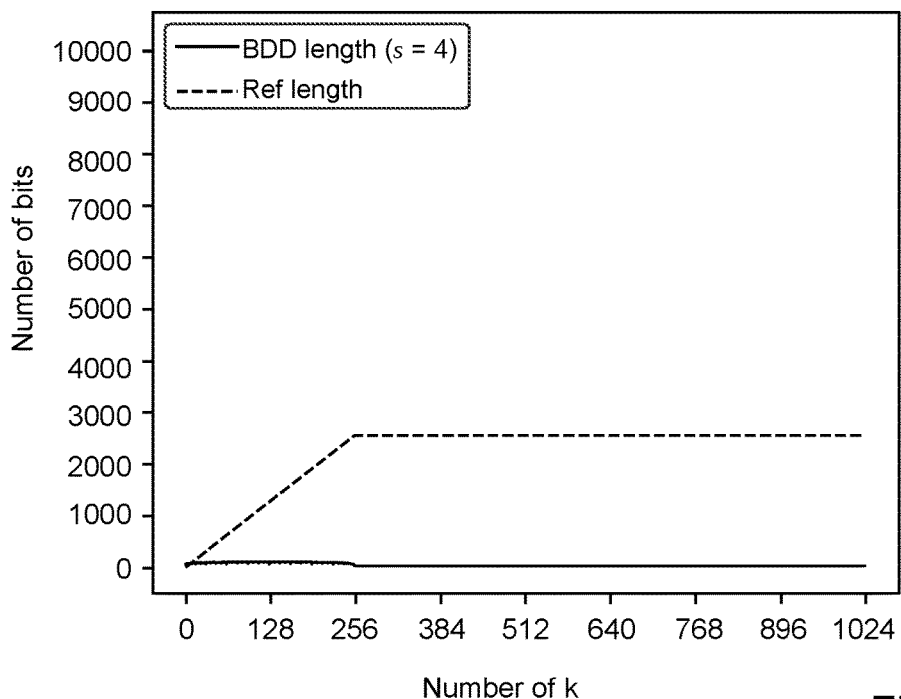
Figure 19D:
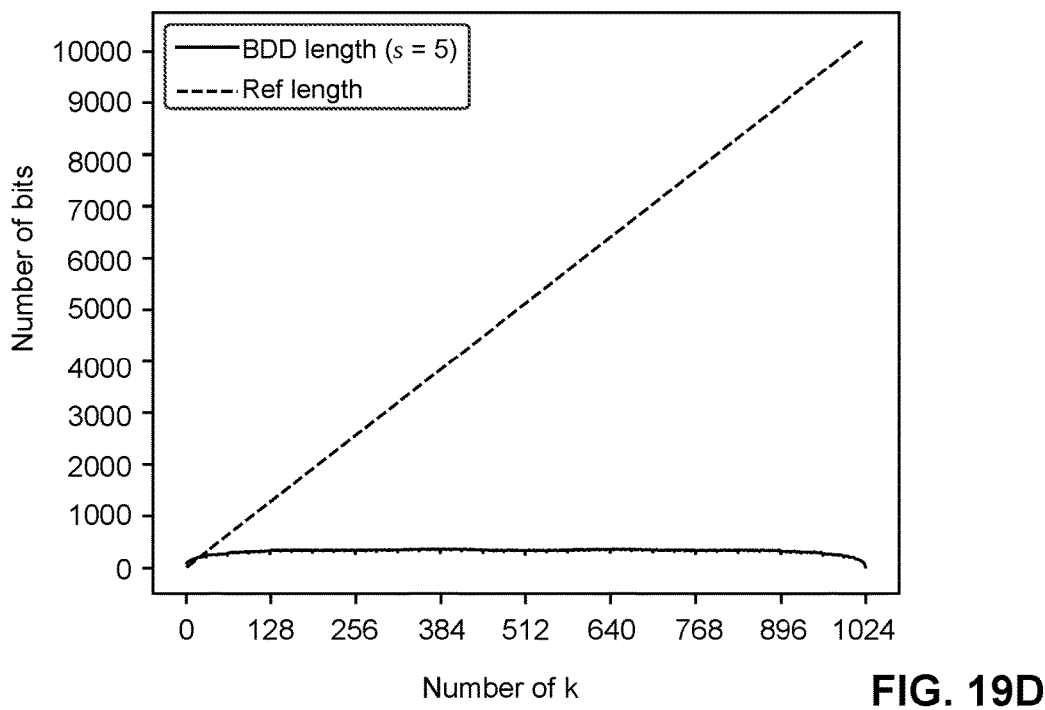
Figure 20A:
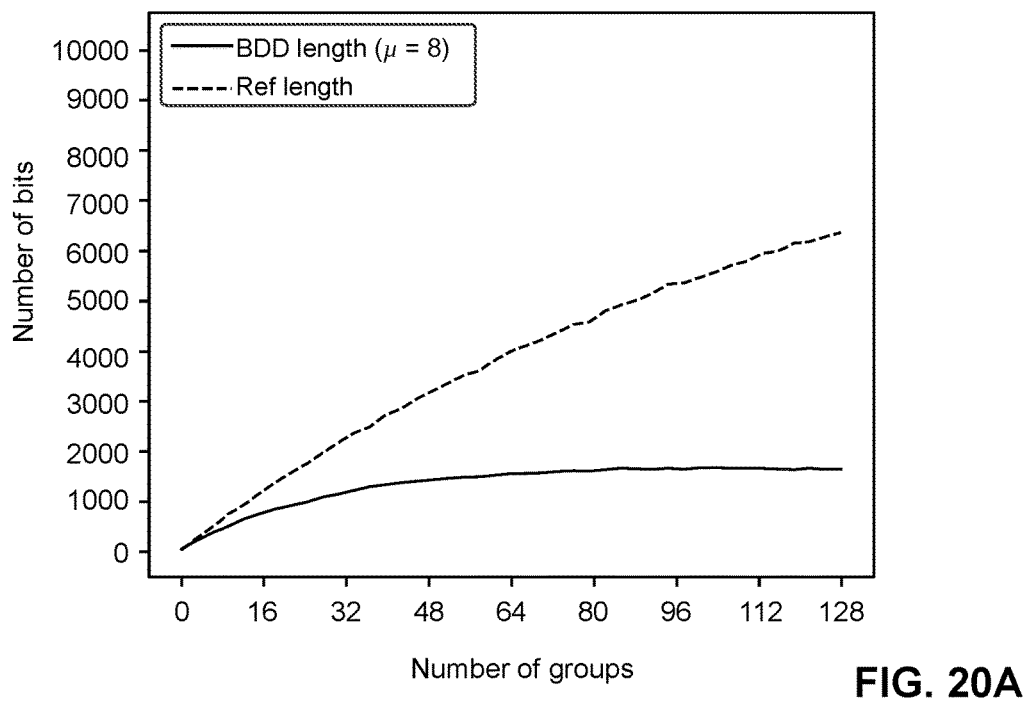
Figure 20B:
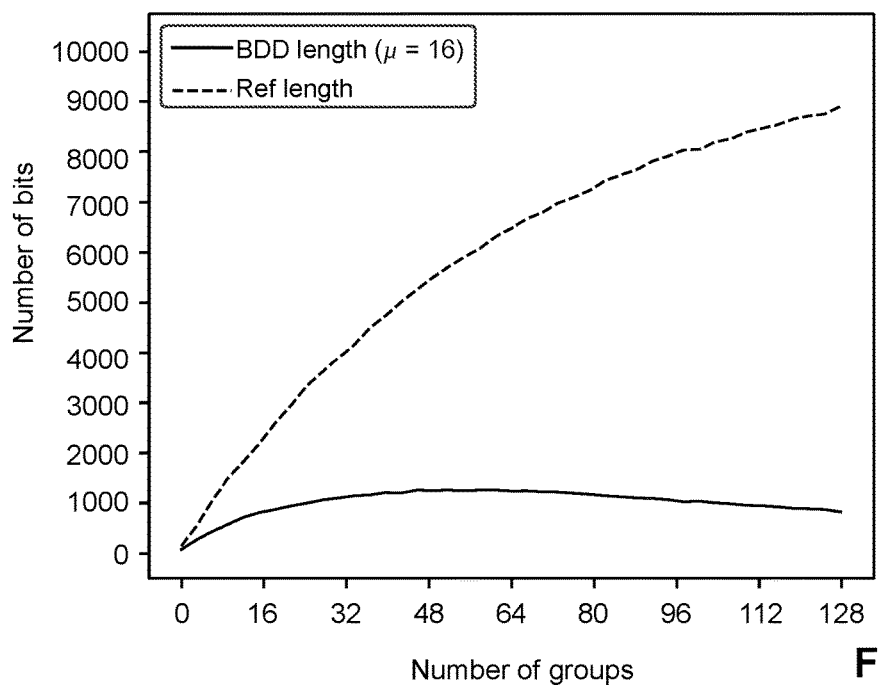
Figure 20C:
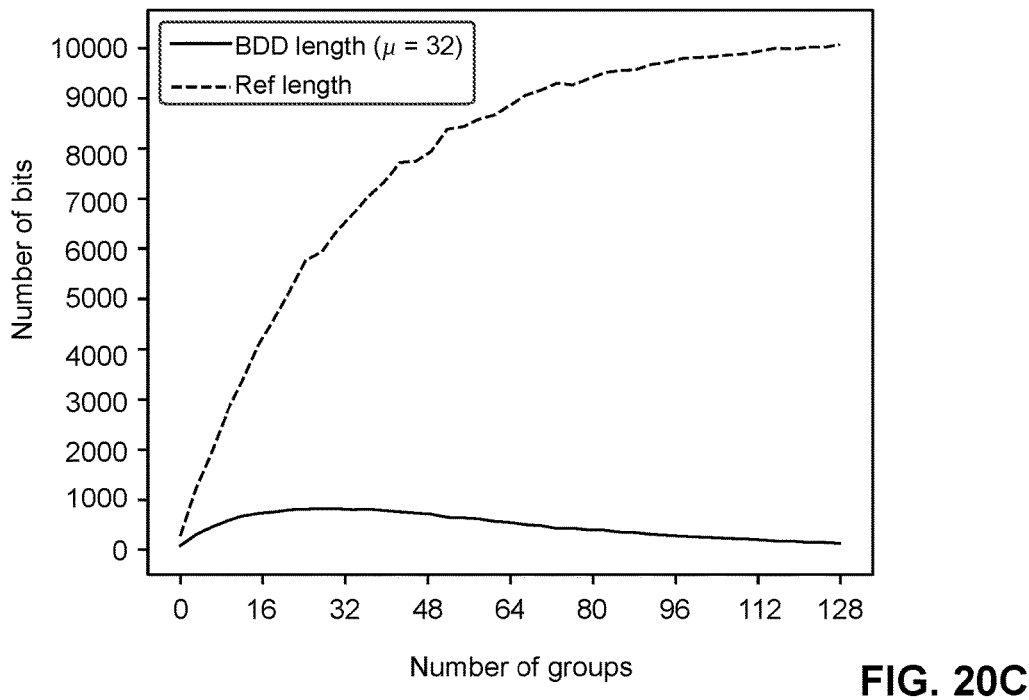
Figure 20D:
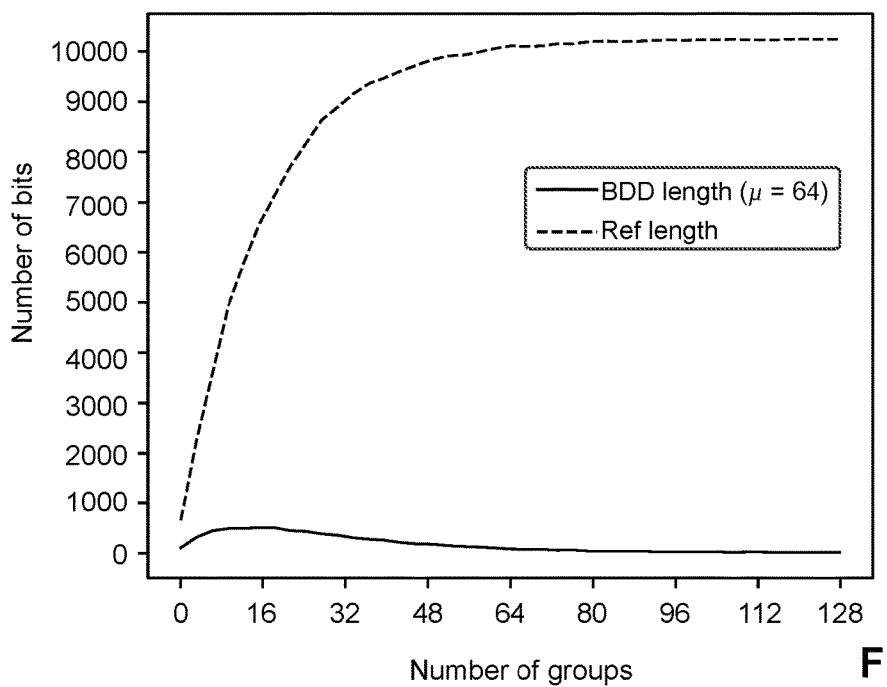

FIG. 18 shows the simulation results in the pure-random scenario, in which the recipients of multicast messages are generated randomly. In the simulation, 100 independent tests are conducted for each given number of recipient devices, ranging from 2 recipient devices to 1024 recipient devices. At each test, the required number of recipient devices are selected from all devices. Then, the averaged bit-length reduction is calculated as the ratio of the total bit length of the encoded codewords (i.e., the BDD lengths) in the 100 tests over the total bit length of the uncoded multicast IDs (i.e., the ref lengths).

FIG. 18 shows the ref length (represented by the dashed line) and the mean BDD length of 100 independent tests (represented by the solid curve) at each given number of recipient devices. As can be seen, the process 500 obtains a significant bit-length reduction when multicast messages are sent to a sufficient number of recipient devices such as more than 200 recipient devices. The average bit length reduction is that the averaged BDD length for all numbers of recipient devices is about ¼ of that of the ref length. When multicast messages are sent to 1024 recipient devices, the bit-length reduction is that the BDD length is about 1/66.3 of the ref length.

FIGS. 19A to 19D show the simulation results in the equal-spaced scenario, in which k linear-spaced recipient multicast IDs are generated in each test, with the first multicast ID $r_1$ being randomly generated ($r_1 \in [1, 1023]$) and the subsequent recipient multicast IDs being $r_k$=($r_1$+(k−

1)*s) (mod 1024), where s is a positive integer representing the spacing, and x(mod 1024) represents the residue of x divided by 1024. In the simulation, k ranges from 1 to 1023 and s may take a value in {1, 3, 4, 5}, i.e., s may be 1, 3, 4, or 5. Duplicated multicast IDs may be generated. However, each of the encoded multicast ID codeword and uncoded multicast ID list only comprises unique multicast IDs.

The BDD lengths shown in FIGS. 19A to 19D are the mean or average of 100 independent tests. As can be seen, the process 500 obtains a maximum of 365.7 times bit-length reduction, and the average bit-length reductions are 39.2, 22.8, 46.5, 16.5 times, for s=1, 3, 4, 5, respectively.

FIGS. 20A to 20D show the simulation results in the random-sets scenario. In this scenario, g sets of multicast IDs are generated (g ∈[1, 128]). The multicast IDs in each set are consecutive, although the first multicast ID of each set is randomly generated. The sizes of the sets follow a truncated normal distribution which is a truncated version of a normal distribution with mean μ being 8, 16, 32, or 64, and the standard deviation of the truncated normal distribution being σ=μ., which is truncated within [1, 2 μ]. Duplicated multicast IDs may be generated. However, each of the encoded multicast ID codeword and uncoded multicast ID list only comprises unique multicast IDs.

The BDD lengths shown in FIGS. 20A to 20D are the mean or average of 100 independent tests. As can be seen, the process 500 obtains a maximum of 359.5 times bit-length reduction, and the average bit-length reductions are 2.5, 5.5, 21.8, 138.5 times, for μ=8, 16, 32, 64, respectively.

Those skilled in the art will appreciate that various alternative embodiments are readily available. For example, those skilled in the art will appreciate that in some alternative embodiments, the minterm for each multicast ID may be obtained from the LSB to the MSB thereof, and as an example, the minterm for the multicast ID 1101 in these embodiments is $x_3 x_2 \overline{x_1} x_0$.

In some alternative embodiments, the output of the naive method is further compressed by for example, Huffman coding. Although complicated approaches can further reduce the length B of the output code, the decoding process becomes much more complicated.

In some alternative embodiments, the central-node device 102 may have a hardware structure similar to that shown in FIG. 3, and accordingly may have a software structure similar to that shown in FIG. 5.

In some alternative embodiments, one or more end-node devices 104 may be a system on a chip (SoC) with one or more of the components 108 to 114 integrated into a single integrated-circuit (IC) chip.

In some alternative embodiments, one or more end-node devices 104 may have a hardware structure similar to that shown in FIG. 2.

In some alternative embodiments, one or more end-node devices 104 may not comprise any output components and thus may not comprise any output management programs.

In some alternative embodiments, one or more end-node devices 104 may not comprise any input components and thus may not comprise any input management programs.

In some alternative embodiments, one or more end-node devices 104 may have a hardware structure similar to that shown in FIG. 2, and accordingly may have a software structure similar to that shown in FIG. 4.

In some alternative embodiments, the Device ID and multicast ID of each device of the system 100 may be assigned by a management device such as a central-node device 102, and may be in any suitable form such as the same as the IP address of the device.

In some alternative embodiments, the Device ID of each device of the system 100 is the MAC address thereof, and the multicast ID thereof may be the same as the device ID. In these embodiments, step 310 of process 300 shown in FIG. 8 may be omitted.

In some alternative embodiments, the IDs of recipient devices may be arranged into a plurality of ID sets. Each ID set is losslessly encoded into a codeword using above-described methods. Therefore, the total length of the plurality of codewords is shorted than that of the IDs of the recipient end-node devices and thereby require less bandwidth for transmission.

Figure 21:
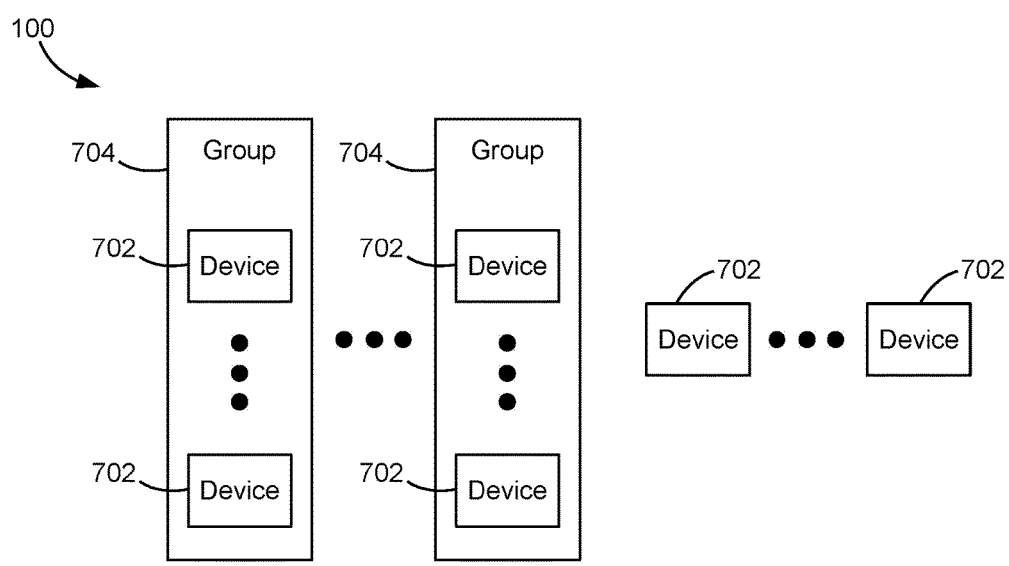
FIG. 21 is a block diagram of a network system, according to some embodiments of this disclosure, wherein at least some devices in the system are arranged into a plurality of multicast groups.

In some alternative embodiments as shown in FIG. 21, at least some devices 702 such as at least some end-node devices 104 in the system 100 are arranged into a plurality of multicast groups 704. Each multicast group may be organized in a way similar to a subnet and has a group or subnet multicast address or ID. For example, if the multicast IDs are assigned in a way similar to the style of IP addresses, then a group or subnet $n_1.n_2.0.0$ where $n_1$ and $n_2$ are integers between 0 and 255, may has a group multicast ID $n_1.n_2.255.255$. Each device 702 in the group is associated with the group multicast ID.

A sender such as a central-node device 102 may send one or more condensed multicast messages to a plurality of individual listener devices 702 and/or multicast groups 704. Therefore, the list of recipient IDs of a multicast message may comprise one or more group multicast IDs. When a message is sent to a multicast group 704, all devices 702 therein receive and process the message.

Figure 22:
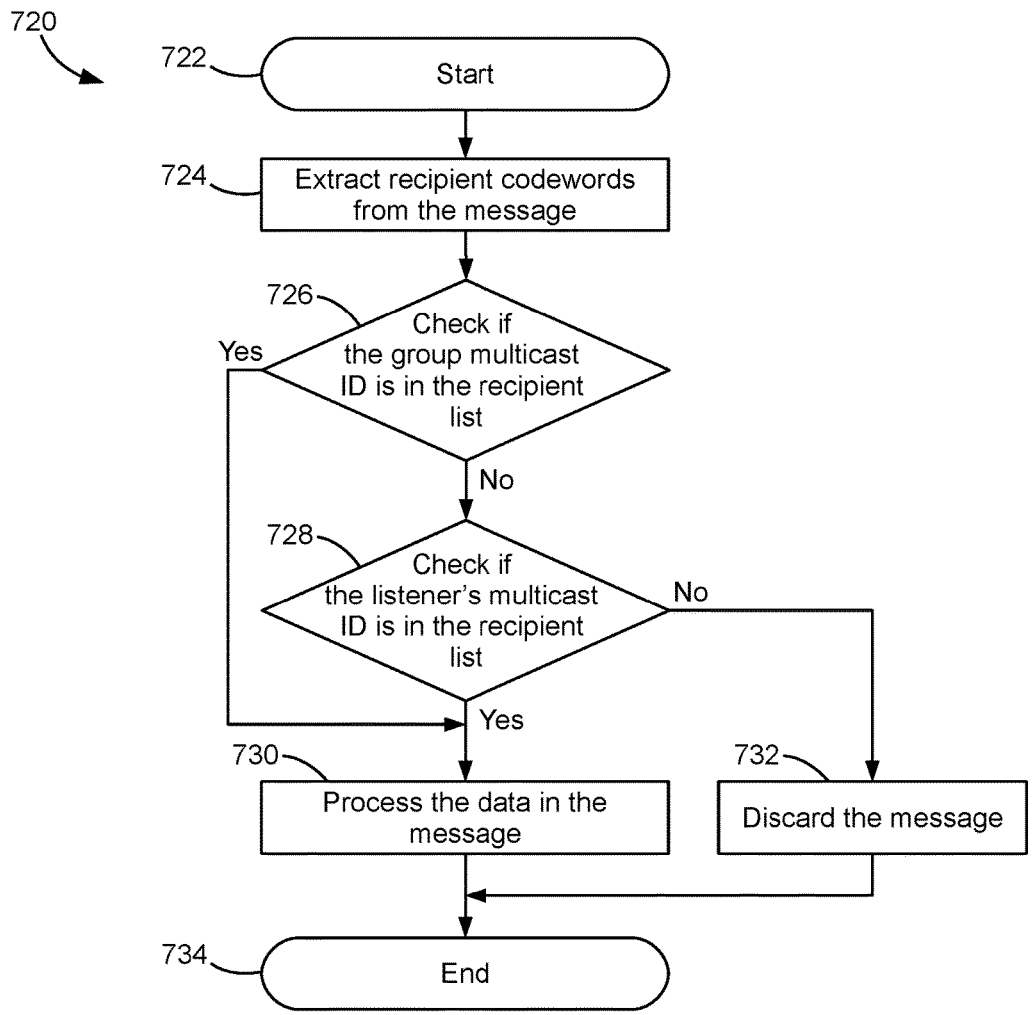
FIG. 22 is a flowchart showing a process executed by a listener of the system shown in FIG. 21 for determining if the listener is a recipient of a received multicast message.

FIG. 22 is a flowchart showing a process 720 executed by a listener 702 for determining if the listener 702 is a recipient of a received multicast message. As shown, the process 720 starts when a multicast message is received (step 722). The listener 702 extracts the payload from the message and extracts the one or more recipient codewords from the payload (step 724).

The listener 702 then determines if the group multicast ID that the listener 702 is associated therewith is in the recipient list (step 726). Any of the above-described methods such as those used in the processes 400 and/or 600 may be used for determination. If the group multicast ID is in the recipient list, the process 720 goes to step 730 to process the data in the multicast message. The process 720 then ends (step 734).

If at step 726, the group multicast ID is not in the recipient list, the process 720 then goes to step 728 to check if the listener's multicast ID is in the recipient list. If the listener's multicast ID is in the recipient list, the process 720 goes to step 730 to process the data in the multicast message. The process 720 then ends (step 734).

If at step 728, the listener's multicast ID is not in the recipient list, the process 720 goes to step 732 and discards the received multicast message. The process 720 then ends (step 734).

In some alternative embodiments, a listener may first check if the listener's multicast ID is in the recipient list. If the listener's multicast ID is not in the recipient list, the listener then checks if the group multicast ID that the listener is associated therewith is in the recipient list.

In some alternative embodiments where every listener device is associated with a multicast group, a listener may only check if the group multicast ID that the listener is associated therewith is in the recipient list.

Figure 23:
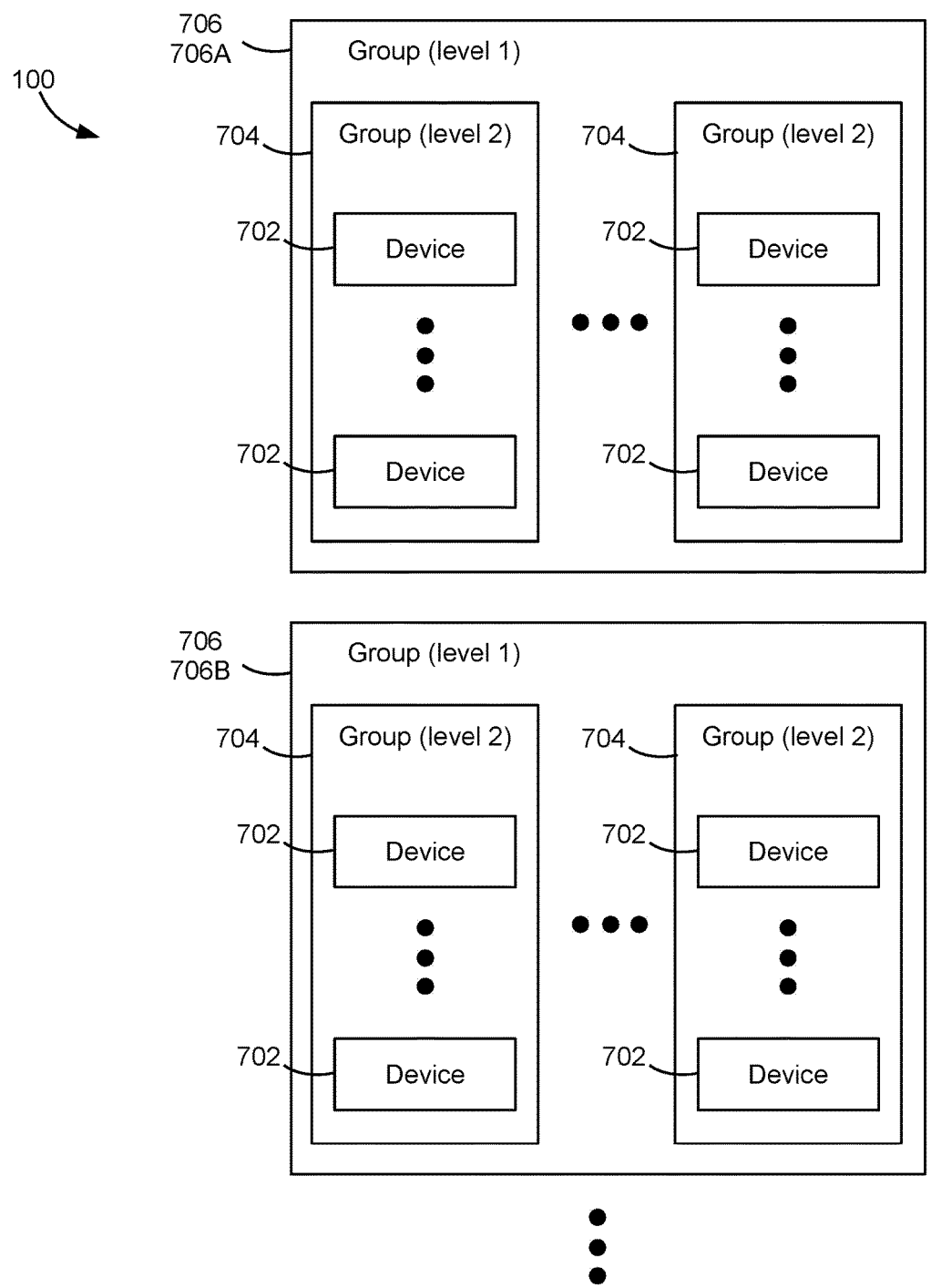
FIG. 23 is a block diagram of a network system, according to some embodiments of this disclosure, wherein at least some devices in the system are arranged into multiple levels of groups.

In some alternative embodiments, at least some of the devices in the system 100 may be arranged into multiple levels of groups. For example, FIG. 23 shows a system 100 comprising a plurality of level-1 groups 706 including the level-1 groups 706A and 706B. Each level-1 group 706 comprises one or more level-2 groups 704, and each level-2 group 704 comprises a plurality of devices 702 such as a plurality of end-node devices 104. Each group 704, 706 comprises a group multicast ID.

Figure 24:
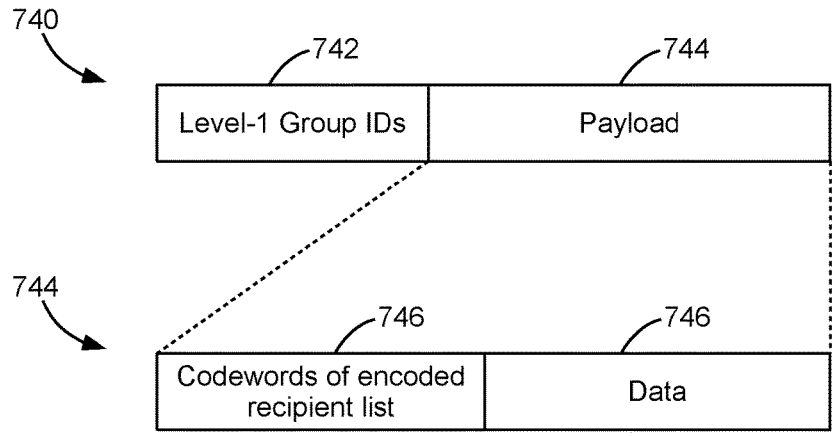
FIG. 24 shows the structure of a condensed multicast message used in the system shown in FIGS. 23.

In these embodiments, each level-1 group 706 may comprise devices in a same geographic area such as a same city. Each level-2 group 704 may comprise devices grouped under suitable criteria such as organization, geolocation, use, and/or the like. A multicast message may be sent to a plurality of devices 702 in one or more level-1 groups 706. As shown in FIG. 24, a multicast message 740 in these embodiment may comprise a header 742 and a payload 744. The header 742 comprises having the group multicast IDs of the one or more level-1 groups 706 that the multicast message to be sent to. The payload 744 comprises one or more codeword sets. Each codeword set corresponds to a level-1 group 706 and comprises one or more codewords constructed as described above for encoding the multicast IDs of the recipient devices 702 and/or level-2 groups 704 in the corresponding level-1 group 706.

In some embodiments, the system 100 may comprise a management device such as a gateway for managing devices of each level-1 group 706. When the management device receives a multicast message having a structure as shown in FIG. 24, the gateway determines if the multicast ID of the level-1 group thereof is in the header 742. If the multicast ID of the level-1 group thereof is in the header 742, the gateway extracts the payload 744, regenerates a multicast message from the payload 744 by removing the codewords corresponding to other level-1 groups, and broadcasts the regenerated multicast message in the level-1 group.

In some alternative embodiments, a listener device in a level-1 group may receive a multicast message having a structure as shown in FIG. 24. The listener device determines if the multicast ID of the level-1 group that the listener device is associated therewith is in the header 742. If the multicast ID of the level-1 group is in the header 742, the listener device extracts the payload 744, extracts one or more codewords corresponding to the level-1 group, and checks if the listener device is a recipient using the methods as described above.

In some alternative embodiments, the system 100 does not comprise any multicast group. In other words, all devices of the system 100 may be considered in a same multicast group.

In above examples, the system 100 only comprises one central-node device 102, and end-node devices 104 do not send any multicast messages. Therefore, the central-node device 102 in these examples may not have a multicast ID. In some alternative embodiments, the system 100 may comprise a plurality of central-node devices 102, and a central-node device 102 may send multicast messages to other central-node devices. Therefore, each central-node device 102 also comprises a multicast ID.

In above embodiments, end-node devices 104 do not send any multicast messages. In some alternative embodiments, some or all end-node devices 104 may send multicast messages to other end-node devices 104 and the central-node devices. In these embodiments, each central-node device 102 also comprises a multicast ID. Moreover, each device 102, 104 that may act as a sender stores a list of multicast IDs of devices in the group it is associated therewith for generating a recipient list when sending multicast messages.

In these embodiments, the network program 188 of an end-node device 104 that may act as a sender may comprises a functional structure as shown in FIG. 7 for generating and transmitting a condensed multicast message.

In these embodiments, the network interface 158 of a central-node device 102 that may act as a listener may comprises a functional structure as shown in FIG. 11 for receiving a condensed multicast message.

In some alternative embodiments, the recipient Boolean function is simplified or minimized without using BDD and ROBDD. Then, the simplified Boolean function is represented as a binary-tree data structure such as a ROBDD, and the process 500 shown in FIGS. 16A to 16D is used to encode the binary-tree data structure into a codeword.

In some alternative embodiments, other lossless encoding methods such as Huffman encoding, Asymmetric Numeral Systems (ANS), Lempel-Ziv compression and its variations, Run-length encoding (RLE), and the like, may be used to encode the multicast IDs of recipient devices at step 312 of the process 300 shown in FIG. 8. However, these encoding methods may be of high computational complexity and may require high complexity decoding methods. Accordingly, the multicast ID checker 384 of the listener uses the corresponding decoding method for decoding the recipient codewords to obtain the multicast IDs of the recipient devices.

In some alternative embodiments, a sender may send conventional multicast messages with uncoded multicast IDs embedded or encapsulated therein, or may send condensed multicast messages as disclosed herein. When a multicast message is received, each listener may first consider the multicast message as a condensed multicast message and try to decode the recipient codewords to obtain the multicast IDs of the recipient devices. If the decoding fails, the listener then considers the multicast message as a conventional multicast message and extracts the multicast IDs directly from the payload thereof.

In some alternative embodiments, each multicast message comprises a flag indicating whether the multicast message is a conventional multicast message or a condensed multicast message, and each listener may take action accordingly.

Figure 25:
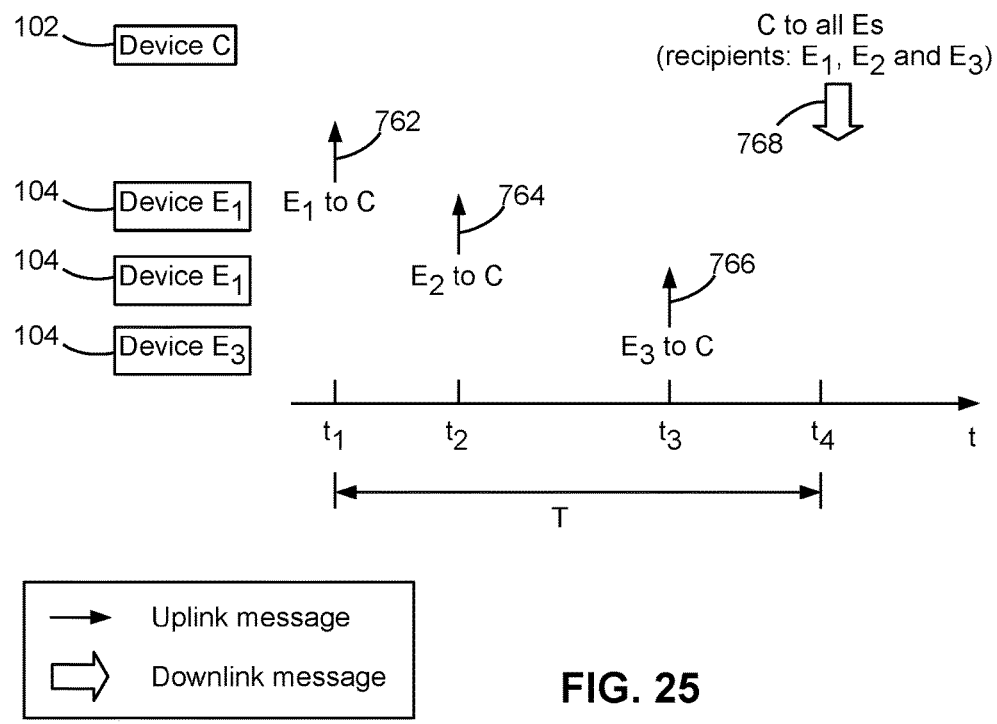
FIG. 25 is a timing diagram showing a central-node device periodically collecting messages received from a plurality of end-node devices during a period of time T, and collectively respond to these end-node devices with a condensed multicast message for acknowledgement.

The methods disclosed herein is beneficial for a network system that has a limited bandwidth and/or computational power for downlink communication (i.e., communication from a central-node device 102 to a plurality of end-node devices 104). In some embodiments, the end-node devices 104 may send messages to a central-node device 102 at random time instants, and the central-node device 102 needs to acknowledge the reception of the messages. As shown in FIG. 25, a central-node device 102 may periodically collect messages received from a plurality of end-node devices 104 during a period of time T, and collectively respond to these end-node devices 104 with a condensed multicast message for acknowledgement.

For example, during a time period T, an end-node device $E_1$ sends a message 762 to a central-node device C at time instant $t_1$, an end-node device $E_2$ sends a message 764 to the central-node device C at time instant $t_2$, and an end-node device $E_3$ sends a message 766 to the central-node device C at time instant $t_3$. The central-node device C collects the messages 762, 764 and 766 received during the time period T. At the end of the time period T, the central-node device C generates a condensed multicast message 768 having an encoded recipient list of $E_1$, $E_2$ and $E_3$ and acknowledgement data, and sends the generated condensed multicast message 768 to all end-node devices. By using such a delayed or collective messaging method, the downlink communication is more efficiently used compared to individually respond to each end-node device.

In some embodiments, one or more end-node devices 104 may be low-power devices. With a suitable communication protocol such as LoRaWAN, each of such end-node devices 104 may periodically change its state between an awake mode in which the end-node device 104 is in operation and a sleep mode in which most components of the end-node device 104 is turned off and/or not in operation for power saving. Such end-node devices 104 may receive message only in the awake mode. In these embodiments, a sender such as a central-node device 102 may not be able to multicast or broadcast a message to all recipient devices at a same time as some of the recipient devices may be in the sleep mode.

Therefore, to send data to a plurality of recipient devices, a sender such as a central-node device 102 may first determine a subset of the recipient devices that are currently awake and will be awake for a certain time interval such as for a predefined time interval. Then, the sender generates a condensed multicast message with the data to be sent for the determined subset of the recipient devices as described above and sends the generated multicast message thereto. The sender may repeat this process for example, periodically, until all recipient devices have received the data.

Although embodiments have been described above with reference to the accompanying drawings, those of skill in the art will appreciate that variations and modifications may be made without departing from the scope thereof as defined by the appended claims.

What is claimed is:

1. A message-communication method comprising:
   at least one of a message-transmission process and a message-receiving process;
   wherein the message-transmission process comprises:
      obtaining a plurality of first multicast identifications (IDs) for a plurality of first devices in a network;
      losslessly encoding the first multicast IDs into one or more first codewords, the total length of the one or more first codewords being shorter than that of the first multicast IDs;
      generating a first message by encapsulating at least the one or more first codewords into a first payload of the first message; and
      transmitting the generated first message to the network; and
   wherein the message-receiving process comprises:
      receiving a second message;
      extracting a second payload from the second message;
      extracting one or more second codewords from the second payload;
      processing the extracted one or more second codewords to obtain a representation of a plurality of second multicast IDs;
      comparing the representation with a listener multicast ID of a second device to determine whether or not the second device is a recipient of the second message;
      further processing the second message if the second device is a recipient of the second message; and
      discarding the second message if the second device is not a recipient of the second message.

2. The method of claim 1, wherein said losslessly encoding the first multicast IDs into the one or more first codewords comprises:
   transforming each first multicast ID into a minterm Boolean function having one or more minterms;
   forming at least one recipient Boolean function as a logic sum of the one or more minterms;
   simplifying the at least one recipient Boolean function to obtain at least one simplified recipient Boolean function; and
   encoding each of the at least one simplified recipient Boolean function to obtain the one or more first codewords.

3. The method of claim 2, wherein said encoding each of the at least one simplified recipient Boolean function to obtain the one or more first codewords comprises:
   representing each of the at least one simplified recipient Boolean function as a binary-tree data structure; and
   converting the binary-tree data structure into one of the one or more first codewords.

4. The method of claim 2, wherein said simplifying the at least one recipient Boolean function comprises:
   representing each recipient Boolean function as a binary decision diagram (BDD); and
   converting each BDD into a reduced ordered binary decision diagram (ROBDD); and
   wherein said encoding each of the at least simplified recipient Boolean function to obtain the one or more first codewords comprises:
   encoding each ROBDD into one of the one or more first codewords.

5. The method of claim 1, wherein the representation is a Boolean function; and
   wherein said comparing the representation with the listener multicast ID of the second device comprises:
   calculating a value of the Boolean function using the listener multicast ID;
   determining that the second device is a recipient of the second message if the calculated value is one; and
   determining that the second device is not a recipient of the second message if the calculated value is zero.

6. The method of claim 1, wherein said processing the extracted one or more second codewords to obtain the representation of the plurality of second multicast IDs comprises extracting a ROBDD from each second codeword; and
   wherein said comparing the representation with the listener multicast ID comprises:
   traversing the extracted ROBDD from a top level thereof following a path determined by the value of the listener multicast ID to determine whether or not the second device is a recipient of the second message.

7. The method of claim 1, wherein the second device is in a group having a group multicast ID; and the message-receiving process further comprising:
   comparing the representation with the group multicast ID to determine whether or not the group is a recipient of the second message;
   further processing the second message, if the group is a recipient of the second message; and
   performing said comparing the representation with the listener multicast ID, if the group is not a recipient of the second message.

8. A device comprising:
   a memory;
   a network interface functionally connectable to a network; and
   a processing structure functionally coupled to the memory and the network interface;
   wherein the processing structure is configured for performing at least one of a message-transmission process and a message-receiving process;

wherein the message-transmission process comprises:
obtaining a plurality of first multicast IDs for a plurality of first devices in the network;
losslessly encoding the first multicast IDs into one or more first codewords, the total length of the one or more first codewords being shorter than that of the first multicast IDs;
generating a first message by encapsulating at least the one or more first codewords into a first payload of the first message; and
transmitting the generated first message via the network interface to the network; and wherein the message-receiving process comprises:
receiving a second message;
extracting a second payload from the second message;
extracting one or more second codewords from the second payload;
processing the extracted one or more second codewords to obtain a representation of a plurality of second multicast IDs;
comparing the representation with a listener multicast ID of the device to determine whether or not the device is a recipient of the second message;
further processing the second message if the device is a recipient of the second message; and
discarding the second message if the device is not a recipient of the second message.

9. The device of claim 8, wherein at least one of the first multicast IDs represents one of the plurality of first devices.

10. The device of claim 8, wherein at least one of the first multicast IDs represents more than one of the plurality of first devices.

11. The device of claim 8, wherein said losslessly encoding the first multicast IDs into the one or more first codewords comprises:
transforming each first multicast ID into a minterm Boolean function having one or more minterms;
forming at least one recipient Boolean function as a logic sum of the one or more minterms;
simplifying the at least one recipient Boolean function to obtain at least one simplified recipient Boolean function; and
encoding each of the at least one simplified recipient Boolean function to obtain the one or more first codewords.

12. The device of claim 11, wherein said encoding each of the at least one simplified recipient Boolean function to obtain the one or more first codewords comprises:
representing each of the at least one simplified recipient Boolean function as a binary-tree data structure; and
converting the binary-tree data structure into one of the one or more first codewords.

13. The device of claim 11, wherein said simplifying the at least one recipient Boolean function comprises:
representing each recipient Boolean function as a BDD; and
converting each BDD into a ROBDD; and
wherein said encoding each of the at least simplified recipient Boolean function to obtain the one or more first codewords comprises:
encoding each ROBDD into one of the one or more first codewords.

14. The device of claim 8, wherein the representation is a Boolean function; and
wherein said comparing the representation with the listener multicast ID of the device comprises:

calculating a value of the Boolean function using the listener multicast ID;
determining that the device is a recipient of the second message if the calculated value is one; and
determining that the device is not a recipient of the second message if the calculated value is zero.

15. The device of claim 8, wherein said processing the extracted one or more second codewords to obtain the representation of the plurality of second multicast IDs comprises extracting a ROBDD from each second codeword; and
wherein said comparing the representation with the listener multicast ID of the device comprises:
traversing the extracted ROBDD from a top level thereof following a path determined by the value of the listener multicast ID, to determine whether or not the device is a recipient of the second message.

16. The device of claim 8, wherein the device is in a group having a group multicast ID; and wherein the message-receiving process further comprising:
comparing the representation with the group multicast ID to determine whether or not the group is a recipient of the second message;
further processing the second message, if the group is a recipient of the second message; and
performing said comparing the representation with the listener multicast ID, if the group is not a recipient of the second message.

17. One or more non-transitory computer-readable storage media comprising computer-executable instructions, the instructions, when executed, causing a processor to perform at least a first set of actions and a second set of actions;
wherein the first set of actions comprises:
obtaining a plurality of first multicast identifications (IDs) for a plurality of first devices in a network;
losslessly encoding the first multicast IDs into one or more first codewords, the total length of the one or more first codewords being shorter than that of the first multicast IDs;
generating a first message by encapsulating at least the one or more first codewords into a first payload of the first message; and
transmitting the generated first message to the network; and
wherein the second set of actions comprises:
receiving a second message;
extracting a second payload from the second message;
extracting one or more second codewords from the second payload;
processing the extracted one or more second codewords to obtain a representation of a plurality of second multicast IDs;
comparing the representation with a listener multicast ID of a second device to determine whether or not the second device is a recipient of the second message;
further processing the second message if the second device is a recipient of the second message; and
discarding the second message if the second device is not a recipient of the second message.

18. The one or more non-transitory computer-readable storage media of claim 17, wherein said losslessly encoding the first multicast IDs into the one or more first codewords comprises:
transforming each first multicast ID into a minterm Boolean function having one or more minterms;

forming at least one recipient Boolean function as a logic sum of the one or more minterms;

simplifying the at least one recipient Boolean function to obtain at least one simplified recipient Boolean function; and encoding each of the at least one simplified recipient Boolean function to obtain the one or more first codewords.

19. The one or more non-transitory computer-readable storage media of claim 18, wherein said simplifying the at least one recipient Boolean function comprises:

representing each recipient Boolean function as a BDD; and converting each BDD into a ROBDD; and wherein said encoding each of the at least simplified recipient Boolean function to obtain the one or more first codewords comprises:

encoding each ROBDD into one of the one or more first codewords.

20. The one or more non-transitory computer-readable storage media of claim 17, wherein the representation is a Boolean function; and wherein said comparing the representation with the listener multicast ID of the second device comprises:

calculating a value of the Boolean function using the listener multicast ID;

determining that the second device is a recipient of the second message if the calculated value is one; and determining that the second device is not a recipient of the second message if the calculated value is zero.

21. The one or more non-transitory computer-readable storage media of claim 17, wherein said processing the extracted one or more second codewords to obtain the representation of the plurality of second multicast IDs comprises extracting a ROBDD from each second codeword; and wherein said comparing the representation with the listener multicast ID comprises:

traversing the extracted ROBDD from a top level thereof following a path determined by the value of the listener multicast ID to determine whether or not the second device is a recipient of the second message.

\* \* \* \* \*